(12) United States Patent
Eagle

(10) Patent No.: US 11,061,301 B2
(45) Date of Patent: Jul. 13, 2021

(54) UNDERWATER PHOTOGRAPHY ACCESSORY FOR PORTABLE ELECTRONIC DEVICE HAVING CAMERA LENS

(71) Applicant: Action Distribution (Pty) Ltd, Cape Town (ZA)

(72) Inventor: Brett Eagle, Constantia (ZA)

(73) Assignee: ACTION DISTRIBUTION (PTY) LTD, Cape Town (ZA)

( * ) Notice: Subject to any disclaimer, the term of this patent is extended or adjusted under 35 U.S.C. 154(b) by 0 days.

(21) Appl. No.: 16/562,662

(22) Filed: Sep. 6, 2019

(65) Prior Publication Data
US 2020/0124943 A1   Apr. 23, 2020

(30) Foreign Application Priority Data
Oct. 22, 2018   (ZA) ................................ 2018/07018

(51) Int. Cl.
*G03B 17/08* (2021.01)
*G03B 17/12* (2021.01)

(52) U.S. Cl.
CPC ............. *G03B 17/08* (2013.01); *G03B 17/12* (2013.01)

(58) Field of Classification Search
CPC ................................ G03B 17/08; G03B 17/12
See application file for complete search history.

(56) References Cited

U.S. PATENT DOCUMENTS

| 2013/0127309 | A1* | 5/2013 | Wyner | ................ | H04B 1/3888 312/223.1 |
| 2017/0059805 | A1* | 3/2017 | Ranetkins | .............. | G03B 17/14 |

* cited by examiner

*Primary Examiner* — Minh Q Phan
(74) *Attorney, Agent, or Firm* — Tucker Ellis LLP

(57) ABSTRACT

Aspects of the present application provide an underwater photography accessory for portable electronic devices. The accessory includes an enclosure and a lens arrangement. The enclosure defines a cavity configured to enclose a portable electronic device having a camera lens and includes an aperture formed in a wall thereof and operatively providing optical communication between a camera lens receiving zone of the cavity and a lens of the lens arrangement. The cavity is dimensioned to accommodate a selected range of portable electronic device dimensions. The aperture is dimensioned such that the camera lens receiving zone operatively accommodates various camera lens positions therein. The cavity accommodates an insert member for operatively holding a cooperating portable electronic device in a position in which a camera lens thereof locates within the camera receiving zone of the cavity.

18 Claims, 15 Drawing Sheets

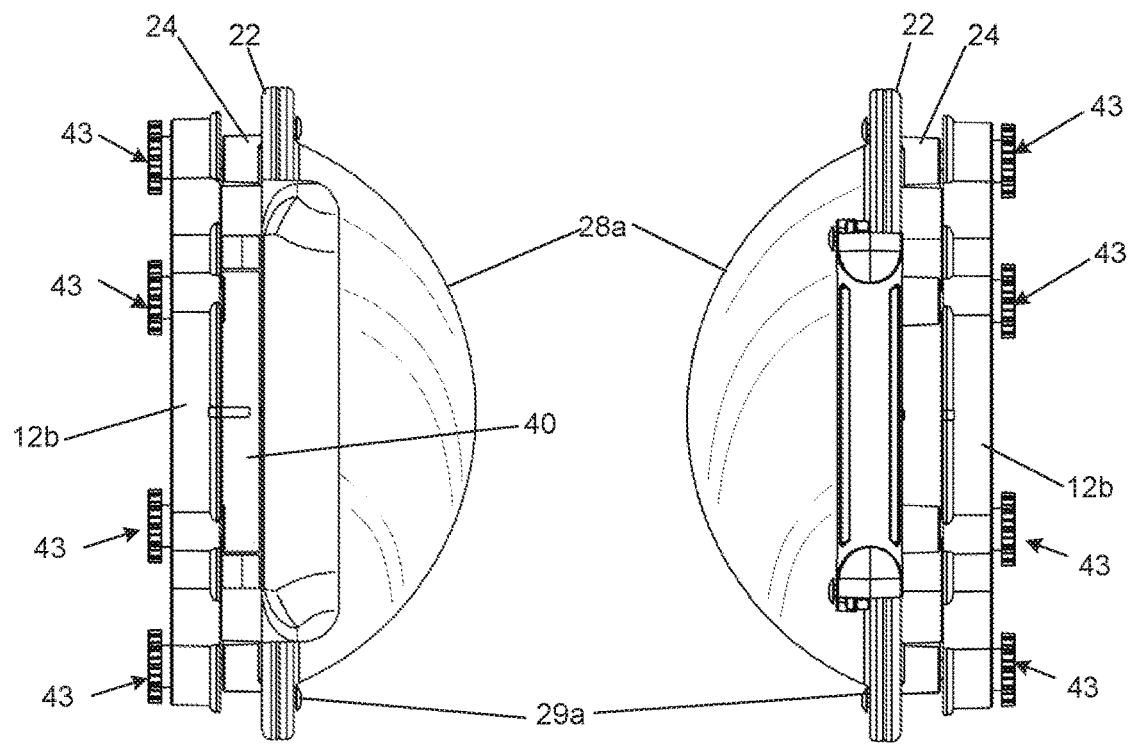
FIGURE 8     FIGURE 7
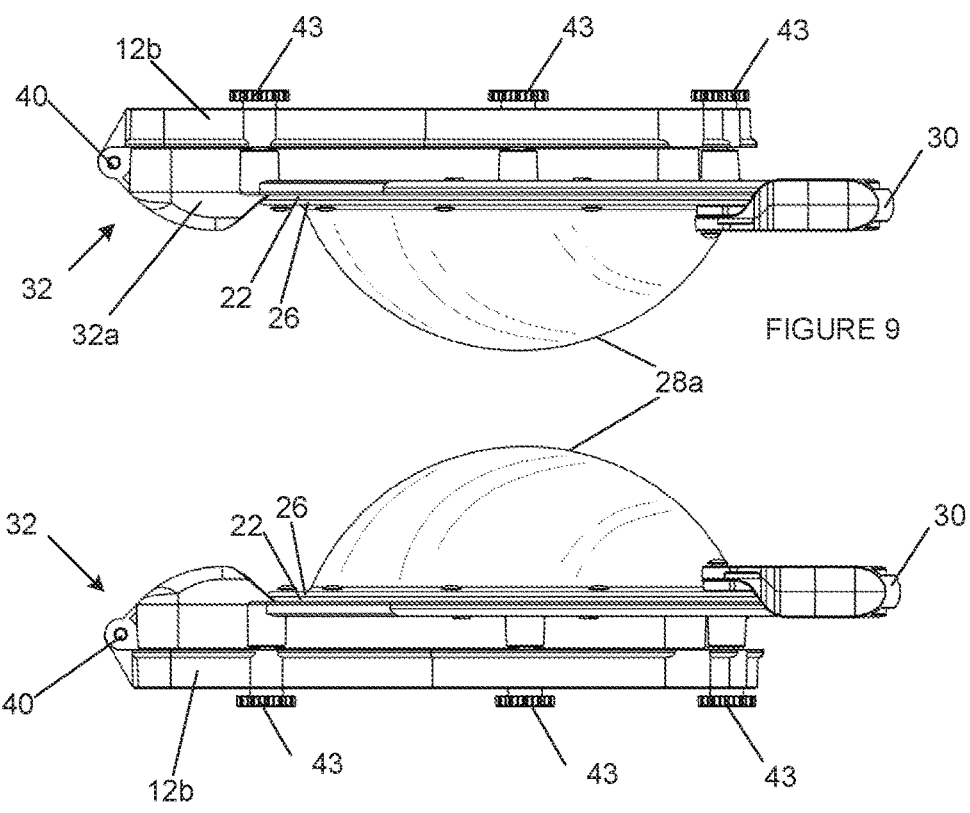
FIGURE 9
FIGURE 10

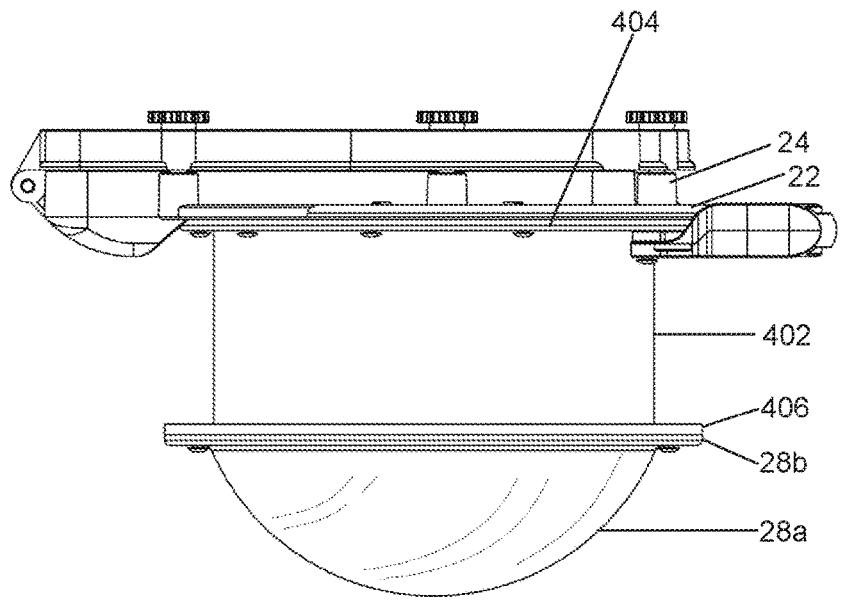
FIGURE 26
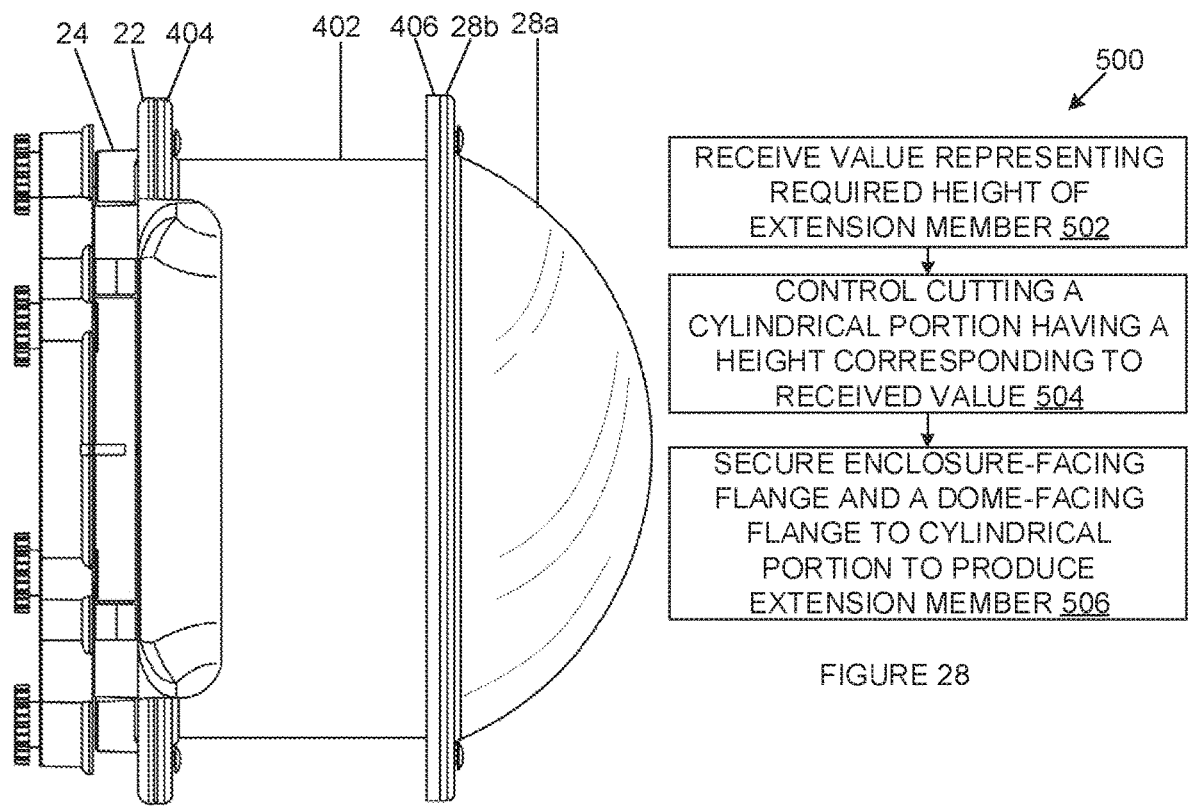
FIGURE 27
FIGURE 28

UNDERWATER PHOTOGRAPHY ACCESSORY FOR PORTABLE ELECTRONIC DEVICE HAVING CAMERA LENS

CROSS-REFERENCE TO RELATED APPLICATIONS

This application claims priority from South African patent application number 2018/07018 filed on 22 Oct. 2018, which is incorporated by reference herein.

FIELD OF THE INVENTION

This invention relates to an accessory for a portable electronic device and in particular to a waterproof housing for a portable electronic device for use in underwater photography.

BACKGROUND TO THE INVENTION

Underwater photography using so-called action cameras is popular. However, with the improved camera functionality of portable electronic devices, such as smart phones and tablet computers, many users are favoring these over more traditional action cameras.

Underwater photography housings are therefore required for such portable electronic devices. One difficulty, however, is the plethora of different shapes and dimensions of portable electronic devices such as smart phones and tablet computers as compared to, for example, action cameras. This requires many customized housings, each being suitable for a particular make and model of portable electronic device.

There is accordingly a need for a housing accessory for a portable electronic device which alleviates the abovementioned problems at least to some extent.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the invention there is provided an accessory comprising an enclosure and a lens arrangement, the enclosure defining a cavity configured to enclose a portable electronic device having a camera lens, the enclosure including an aperture formed in a wall thereof and operatively providing optical communication between a camera lens receiving zone of the cavity and a lens of the lens arrangement, wherein the cavity is dimensioned to accommodate a selected range of portable electronic device dimensions, wherein the aperture is dimensioned such that the camera lens receiving zone operatively accommodates various camera lens positions therein, and wherein the cavity accommodates an insert member for operatively holding a cooperating portable electronic device in a position in which a camera lens thereof locates within the camera receiving zone of the cavity.

Further features provide for the enclosure to include a window for providing communication to a user interface of a portable electronic device and a membrane which closes the window, for the membrane to be translucent or transparent; for the membrane to be flexible so as to deform upon the application of force from a user's finger; and, for the membrane to be resiliently flexible.

Still further features provide for the accessory to include the insert member; for a shape and dimensions of the insert member to conform to that of the cavity defined by the enclosure; for the insert member to be a rectangular solid; for the insert member to be a foam-filled rectangular solid; for the insert member to include a cut-out or templates for cut-outs in the shape of a cooperating portable electronic device for operatively locating and holding the cooperating portable electronic device in the cavity; and, for a thickness of the insert member to exceed a maximum thickness of the selected range of portable electronic device dimensions.

Yet further features provide for the enclosure to be made from a rigid material and include a first assembly piece providing the lens arrangement, the first assembly piece including the aperture, and a second assembly piece securable to the first assembly piece, the second assembly piece including a window for providing communication to a user interface of a portable electronic device.

Even further features provide for the lens arrangement to be a dome lens arrangement, for a circular member to be integrally formed with the wall in which the aperture is disposed to provide a backplate of the dome lens arrangement, and for the first assembly piece to include a side wall which encircles and extends perpendicularly away from the wall for connection to the second assembly piece; for the aperture to locate in the center of the dome lens arrangement; for the lens arrangement to includes a dome lens removably secured to the circular member and for a diameter of the dome lens to be substantially larger than a diagonal of the aperture.

Further features provide for the accessory to include an extension member interposed between the circular member and the dome lens arrangement, for the extension member to include a cylindrical portion having a height which spaces the dome lens arrangement away from the aperture; and, for the height of the cylindrical portion to be selected based on a field of view of a selected portable electronic device and a diameter of a dome lens of the dome lens arrangement.

Still further features provide for the cavity to be substantially rectangular having a diagonal of between 200 mm and 300 mm to accommodate the selected range of electronic device dimensions; and, for the aperture to be rectangular and having a diagonal of between 30 mm and 60 mm.

Embodiments of the invention will now be described, by way of example only, with reference to the accompanying drawings.

BRIEF DESCRIPTION OF THE DRAWINGS

In the drawings:

FIG. 7 is a right-side view of the accessory of FIG. 1;

FIG. 8 is a left-side view of the accessory of FIG. 1;

FIG. 9 is a top view of the accessory of FIG. 1;

FIG. 10 is a bottom view of the accessory of FIG. 1;

FIG. 26 is a top view of the accessory of FIG. 23; and,

FIG. 27 is a left-side view of the accessory of FIG. 23; and

FIG. 28 is a flow diagram which illustrates an example method for manufacturing an extension member for an underwater photography accessory according to aspects of the present disclosure.

DETAILED DESCRIPTION WITH REFERENCE TO THE DRAWINGS

Figure 1:
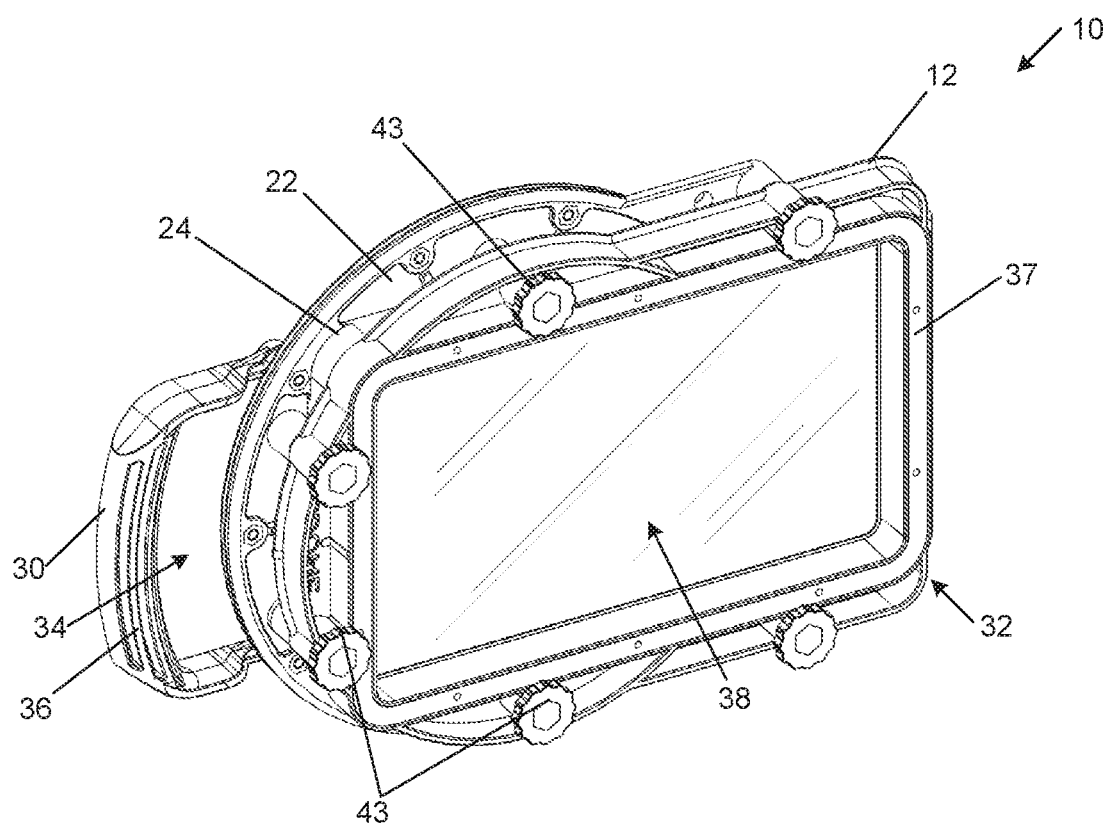
FIG. 1 is a rear three-dimensional view of an accessory according to one embodiment of the present disclosure.
Figure 2:
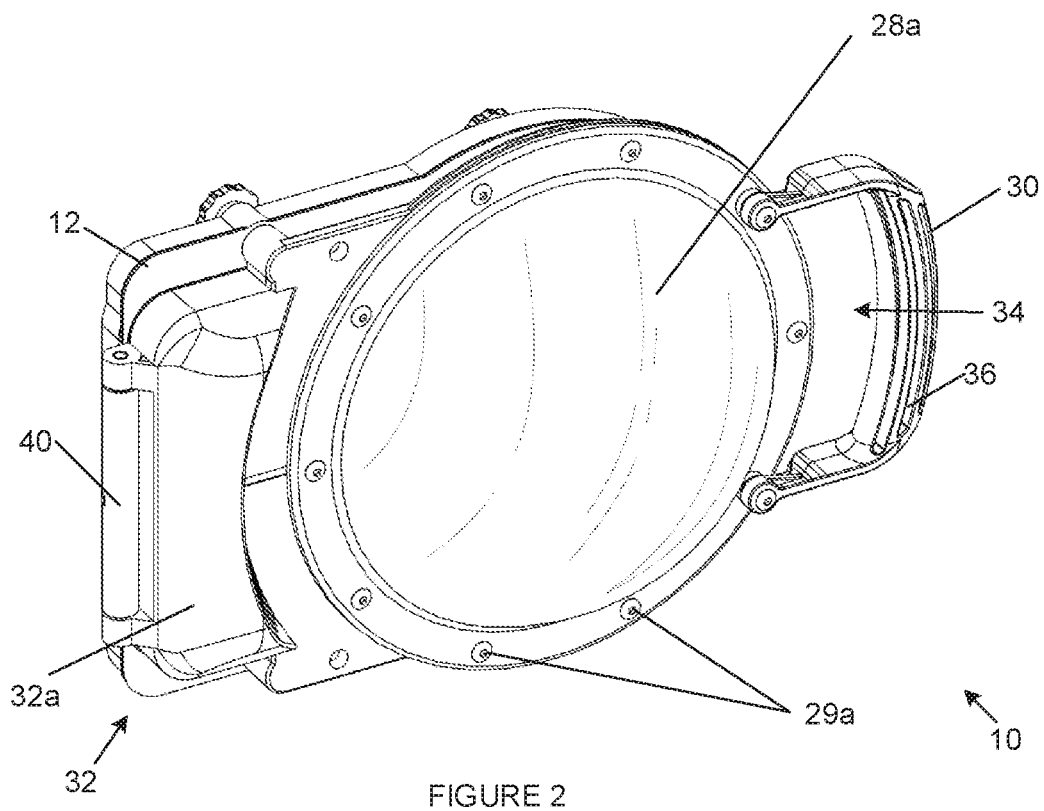
FIG. 2 is a front three-dimensional view of the accessory of FIG. 1.
Figure 3:
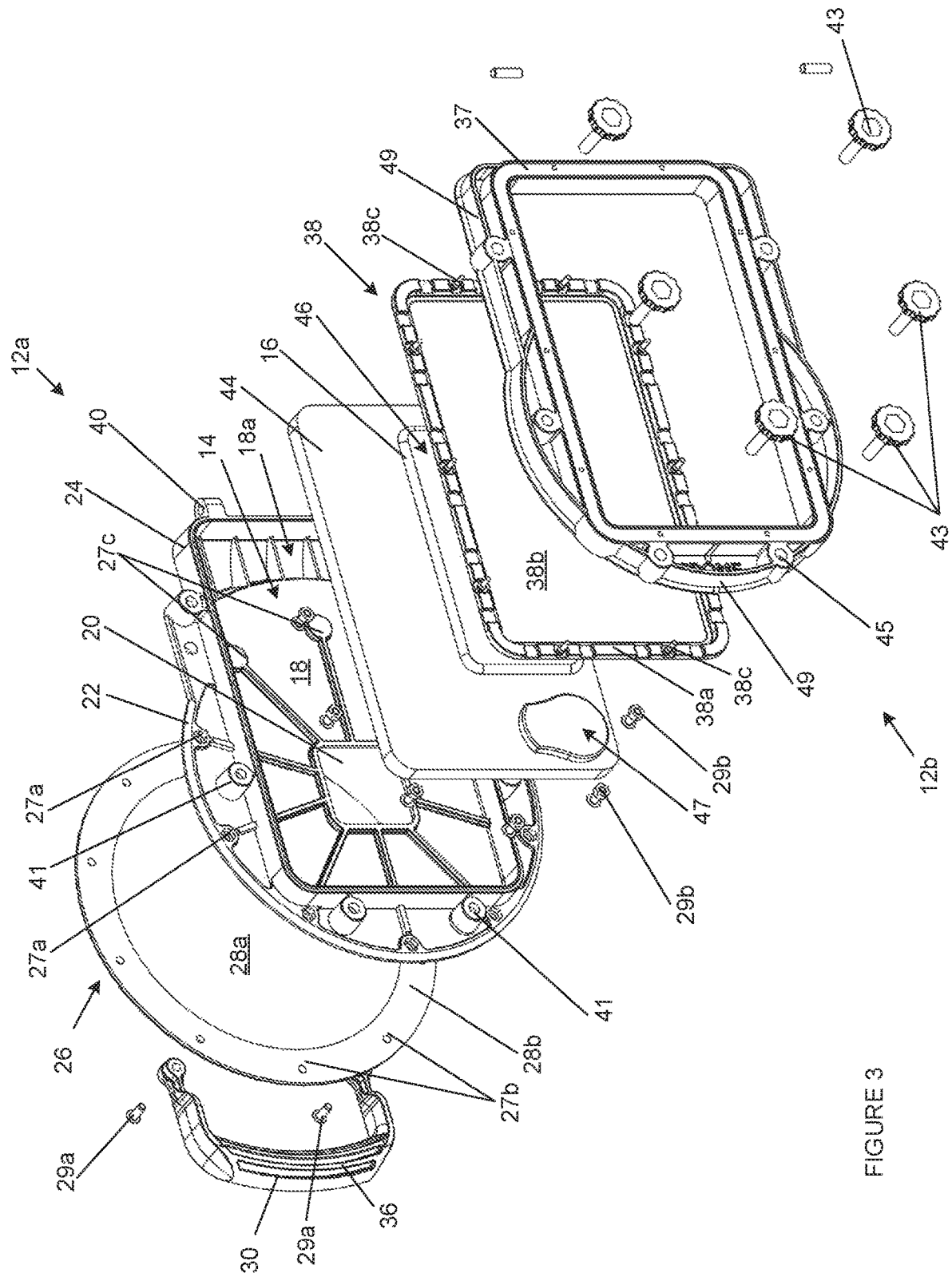
FIG. 3 is a rear exploded view of the accessory of FIG. 1.
Figure 4:
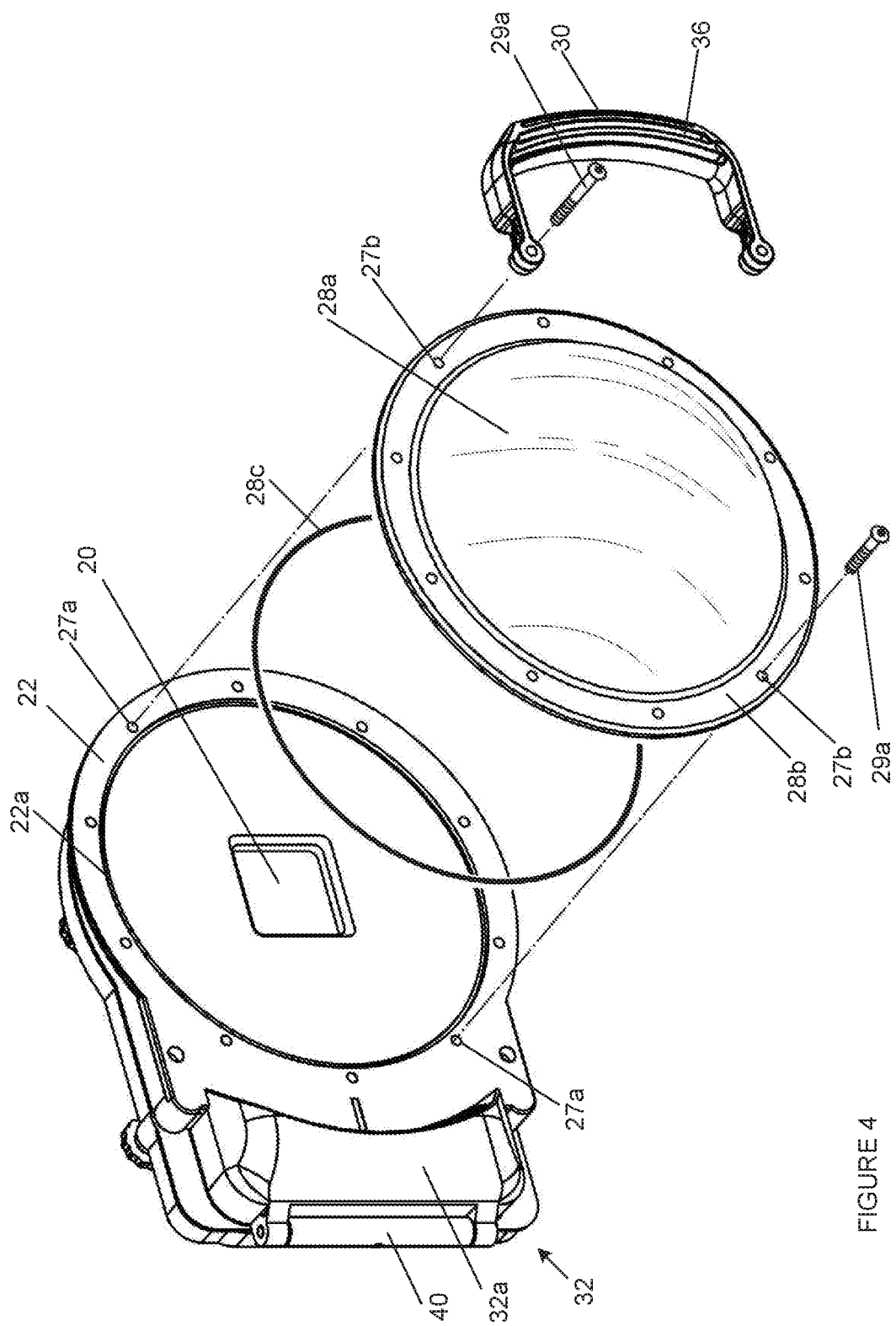
FIG. 4 is a front exploded view of the accessory of FIG. 1.
Figure 5:
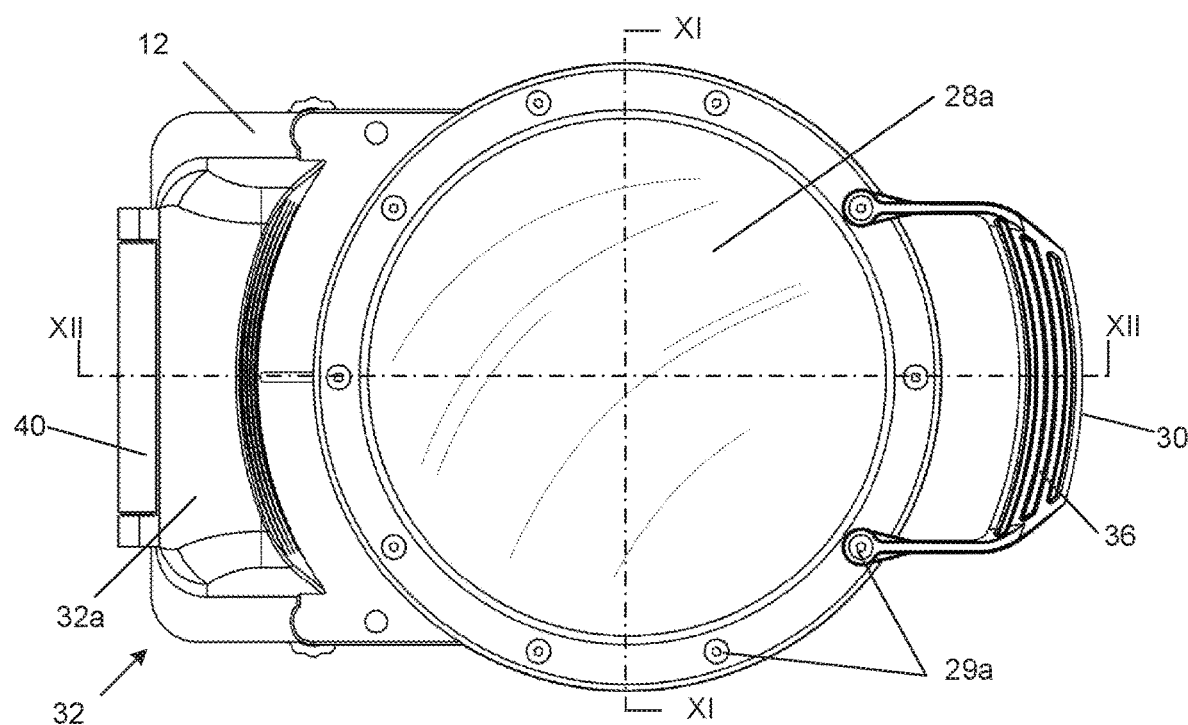
FIG. 5 is a front view of the accessory of FIG. 1.
Figure 6:
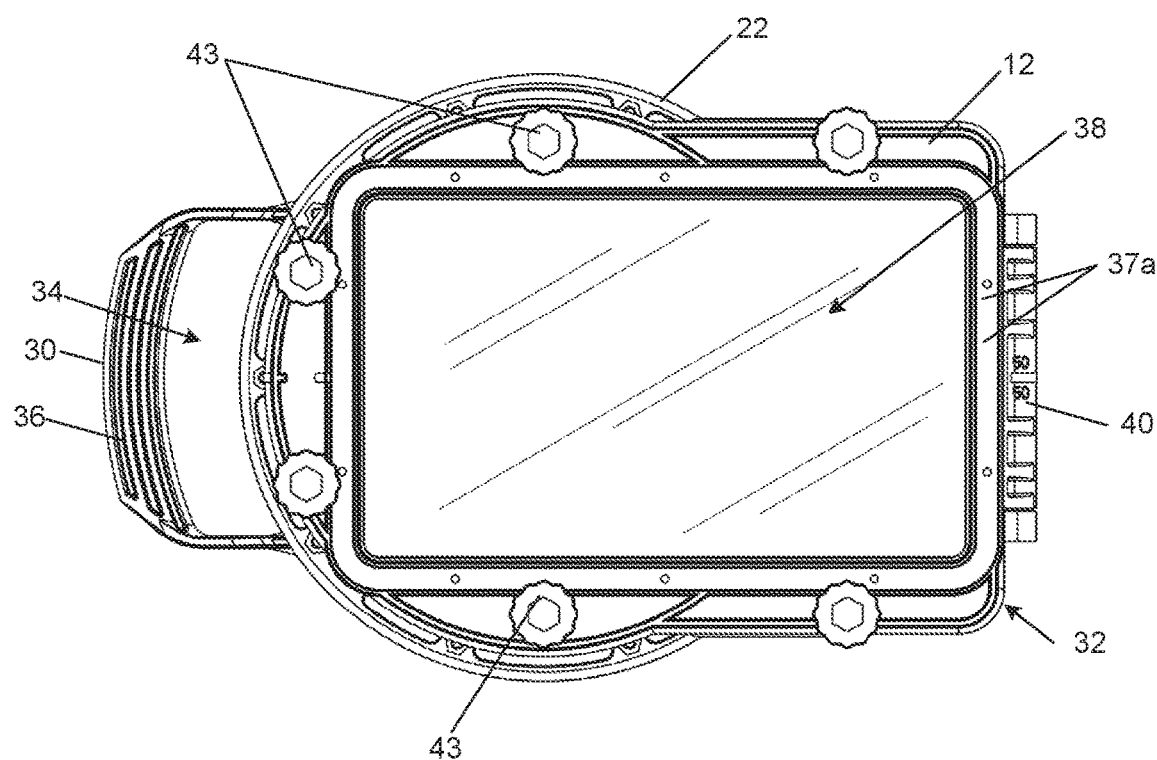
FIG. 6 is a rear view of the accessory of FIG. 1.
Figure 11:
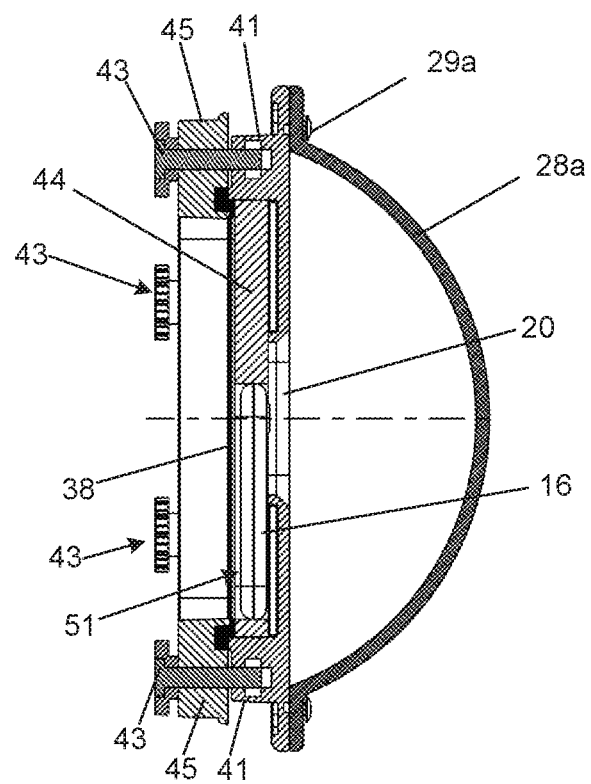
FIG. 11 is a section view along the line XI-XI of FIG. 5.
Figure 12:
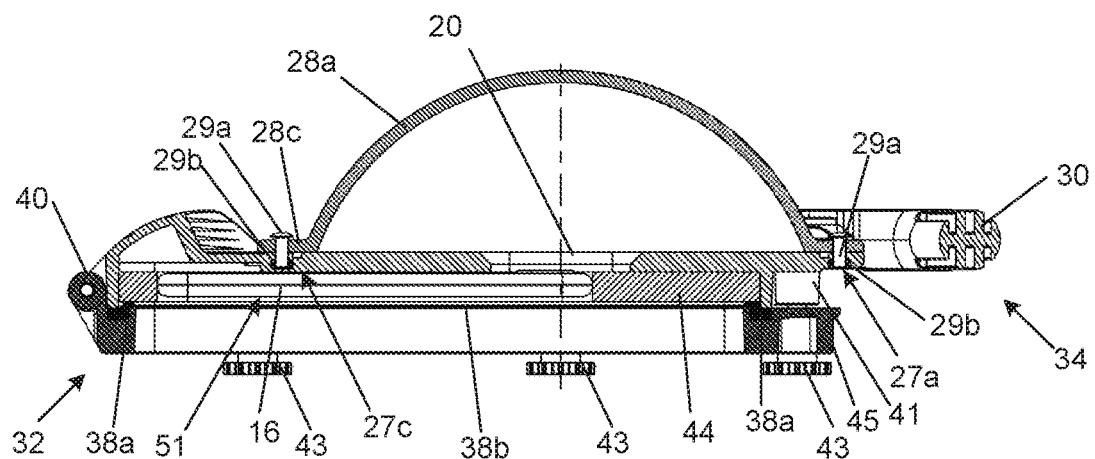
FIG. 12 is a section view along the line XII-XII of FIG. 5.

Aspects of the present disclosure provide an underwater photography accessory for portable electronic devices. The accessory may include an enclosure which may be formed using a rigid material, such as a rigid plastic material. The enclosure may include a lens arrangement and may define a cavity for enclosing a portable electronic device having a camera lens. The cavity may be shaped and dimensioned to accommodate a selected range of portable electronic device dimensions.

An aperture may be formed in a wall of the enclosure operatively to provide optical communication between a camera lens receiving zone of the cavity and a lens of the lens arrangement. The aperture may be dimensioned such that the camera lens receiving zone operatively accommodates various positions of a camera lens at which optical communication between the camera lens and the lens of the lens arrangement is possible.

The enclosure may define a window for providing communication with a user interface (e.g. a touch-sensitive display) of a portable electronic device operatively housed within the enclosure. The window may be closed by way of a suitable membrane. The membrane may be translucent or transparent such that a user interface of a portable electronic device locating within the cavity may be sufficiently visible for a user to interface therewith. The membrane may be flexible and optionally resiliently flexible so as to deform upon the application of force from a user's finger to allow physical interaction between the user's finger and a user interface of a portable electronic device housed within the enclosure. In some embodiments, the membrane may have a concave shape so as to facilitate interaction with the user interface while minimizing any required deformation of the membrane.

In the disclosure which follows, different embodiments of an underwater photography accessory are described. Some embodiments provide enclosures shaped and dimensioned to accommodate a selected range of portable electronic devices in the form of smartphones, tablet computers and the like.

In such embodiments, the selected range of portable electronic device dimensions may include portable electronic devices having a length in the range of 120 mm to 200 mm, a width in the range of 40 mm to 140 mm and a thickness in the range of 4 mm to 10 mm. In some cases, the dimensions of the cavity may be oversized relative to the largest portable electronic device with which it is designed to cooperate. It should thus be appreciated that a wide variety of smartphones and tablet computers may be accommodated within the cavity of an accessory described herein. For example, a single accessory as described herein may be compatible with the range of portable electronic devices from an iPhone™ 5 up to an iPhone™ XS or even up to an iPad™ Mini (iPhone and iPad are trademarks of APPLE INC.). Depending on the portable electronic device used, the dimensions of the cavity may be oversized to accommodate the portable electronic device as well as accessories that communicate therewith, such as a wireless remote-control device, a shutter remote (e.g. that connects to a headphone jack) and other such accessories having wired or wireless communication capabilities.

In such embodiments, the aperture may be generally rectangular in shape and may have a length and width of between 20 to 45 mm (and hence a diagonal of between about 30 mm and 60 mm). The aperture may therefore be oversized relative to the camera lens of a cooperating portable electronic device, which may be in the range of 4 to 8 mm. The aperture may also be located within the cavity and dimensioned so as to allow for the camera lens of the portable electronic device to be offset from or relative to a center of the lens of the lens arrangement. This may reduce glare caused by direct sunlight entering the lens arrangement in use. The aperture may also be dimensioned such that the camera lens receiving zone operatively accommodates a third-party lens fitted to the portable electronic device. For example, the camera lens of the portable electronic device may be fitted with wide angle lenses, ND filters, CPL filters and the like. The oversized aperture may also accommodate portable electronic devices with dual-camera lenses so that both lenses of a dual-camera lens-enabled portable electronic device can be used. This may enable use of dual camera systems for underwater photography.

Other embodiments provide enclosures shaped and dimensioned to accommodate a selected range of portable electronic devices in the form of digital cameras, such as digital single lens reflex (DSLR) cameras, mirrorless cameras, bridge cameras, point-and-shoot cameras and the like.

Aspects of the present disclosure may therefore provide a one-size-fits all underwater accessory which is compatible with a wide range of portable electronic devices and a wide range of portable electronic device dimensions.

One example embodiment of an accessory according to aspects of the present disclosure is illustrated in FIGS. 1 to 12. The accessory (10) includes a rigid enclosure (12) which defines a cavity (14) configured to enclose a portable electronic device (16) therein. The cavity (14) is shaped and dimensioned to accommodate a selected range of portable electronic device dimensions. In this embodiment, the cavity (14) is substantially rectangular and has a diagonal of between 200 to 300 mm. The cavity may be shaped and dimensioned to accommodate portable electronic devices having a length in the range of 120 mm to 200 mm, a width in the range of 40 mm to 140 mm and a thickness in the range of about 4 mm to 10 mm. In some implementations, the cavity is oversized in relation to the largest portable electronic device falling within a selection of compatible portable electronic device dimensions so as to accommodate an insert member provided to hold or cradle the portable electronic device in an operating location. The enclosure (12) includes a first assembly piece (12a) and a second assembly piece (12b) secured to the first assembly piece (12a) by way of a hinge arrangement and appropriate fasteners.

The first assembly piece (12a) includes a back wall (18) in which an aperture (20) is disposed. In this embodiment, the aperture (20) is substantially rectangular and may have a length and width of between 20 to 45 mm (and hence a diagonal of between about 30 mm and 60 mm). The aperture (20) is located in the back wall (18) towards a first of two minor sides of the enclosure (12). The aperture may, for example, be located in between a midpoint of the enclosure and the first minor side of the enclosure. In the illustrated embodiment, the aperture is centered on a longitudinal axis of the enclosure (i.e. located midway between first and second major sides of the enclosure) while in other embodiments the aperture (20) may locate more towards the first major side of the enclosure than the second major side of the enclosure (i.e. the aperture may be off-centered relative to a longitudinal axis of the enclosure).

A side wall (24) encircles and extends perpendicularly away from the back wall (18) and defines a rim for connection to the second assembly piece (12b).

A circular member (22) is integrally formed with the back wall (18) of the first assembly piece to provide a backplate of a dome lens arrangement (26). The circular member may be centered on the aperture (20). In the illustrated embodiment, flanges extend from both major sides of the enclosure away from the side wall (24) of the enclosure and in the same plane as the back wall (18) to connect the circular member to nut formations (41) of a nut and bolt arrangement which locate proximate the hinge mechanism. In the illustrated embodiment, the circular member includes a seat (22a) which cooperates with and at least partially receives a seal (28c). The seat may be in the form of a groove or channel formed in an outer surface of the circular member. The circular member (22) may include a circumferential lip and ribbing to improve the strength thereof as well as a number of bores (27a) for fastening arrangements for fastening a suitable dome lens or extension member to the circular member. The circumferential lip may extend along the periphery of the circular member from points on the circumference which meet the flanges. The ribbing may extend radially away from a center point of the circular member (22). There may be one rib extending from each bore towards the aperture (20).

An attachment mechanism may be fitted within the enclosure, for example on the back wall, for attaching the portable electronic device thereto. For example, in some embodiments, a hook-and-pile- or hook-and-loop-type attachment mechanism may be used while other embodiments may make use of magnets or the like.

The bores (27a) may be through-holes formed on a circumference of the circular member. The bores may form a part of a fastening arrangement for fasting the dome lens or an extension member to the backplate. The fastening arrangement may further include corresponding bores (27b) formed in a supporting flange of the dome lens and a number of corresponding bolts (29a) for passing through the bores (27a, 27b) and fastening the dome lens to the circular member by way of corresponding nuts (29b).

In some implementations, a nut-shaped (e.g. hexagonal) socket may be formed in the circular member and in communication with corresponding bores (27a) for receiving a corresponding nut. Nuts (29b) may be held captive in the bores by way of an extension which extends from the nut, passes through the bore and terminates in a flange. Those fastening arrangements which locate within the back wall (18) of the enclosure may be closed (e.g. to provide blind bores) so as to prevent ingress of water through the bores. This may be achieved by molding closures (27c) into the wall at the time of molding the enclosure (12) (e.g. by way of over-molding). The fastening arrangements may further be configured for attaching an adapter configured for connection to various action camera accessories (e.g. various action camera mounts that are commercially available).

The dome lens arrangement (26) further includes a dome lens (28a) having a diameter which is substantially larger than the aperture (20) of the back wall (18). The dome lens may be supported by a support flange (28b) which provides bores (27b) for fastening the dome lens to the circular member. The support flange (28b) may be integrally formed with the dome lens (28a). When used underwater, a dome lens may allow clearer photographs to be captured using the portable electronic device. This may be because of the relatively large distance between the camera lens of the portable electronic device and the water particles. The dome lens may also enable so-called split, half-in, half-out photographs to be taken.

The dome lens arrangement (26) may include a seal (28c) to seal closed the interface between the circular member and the dome lens. The seal (28c) may be selected to prevent ingress of water through this interface. The seal may be shaped and dimensioned to cooperate with a seat (22a) defined in the circular member. The seal may also effectively trap air within the dome lens arrangement and in some cases the volume of trapped air may provide sufficient buoyancy to the apparatus such that it floats in operation and in the absence of a user's force urging it below water.

In some embodiments, the dome lens (28a) may be interchangeable with another compatible dome lens. This may allow a user to select from a variety of dome lenses. For example, in some cases dome lenses with a different color tint may be provided. The tinted dome lenses may be manufactured by adding a suitable quantity of an appropriately colored dye at the time of molding the dome lens (e.g. during injection molding). A user may then replace one dome lens with another to capture different color images. A user may thus for example be able to select a dome lens with a particular tint to counteract a water color. For example, if the water color is green a magenta tinted dome lens may be selected. If the water color is a deep blue, a red tinted dome lens may be selected.

The back wall (18) and its aperture (20) are arranged in relation to the circular member (22) such that the aperture (20) locates in the center of the circular member (22), and hence in the center of the dome lens arrangement (26). For example, the dome lens (28a) may have a diameter of between 100 mm and 200 mm. The second minor side of the enclosure may thus protrude radially beyond the periphery of the circular member (22) to provide a first gripping formation (32). In the illustrated embodiment, an island formation (32a) is provided on a front facing surface of the enclosure to improve ergonomics of the first gripping formation (32). The island formation is provided by depression (18a) formed in the back wall of the enclosure. The depression extends between the second minor side of the enclosure and an edge which is located towards a periphery of the circular member and which conforms to the shape of the periphery of the circular member. Ribs may extend within the depression between the second minor side of the enclosure and the edge of the depression. In some implementations, a lip may be formed within the cavity and along the edge of the depression. The depression and lip may cooperate to define a water trap for trapping water should a seal of the enclosure fail. The water trap may allow a user to orient the accessory with the depression bottom-most (i.e. with a second gripping formation (30) oriented upwards) to keep water in the water trap and away from the portable electronic device.

The accessory (10) may further include a second gripping formation (30) which extends in a radial direction outwardly beyond the periphery of the circular member (22). The second gripping formation (30) may locate diametrically opposite the second minor side of the enclosure (12) and hence opposite the first gripping formation (32). The second gripping formation (30) may include a curved frame having arms, with ends of each arm being configured for securing to the circular member (22) by means of bores (27a, 27b) and corresponding bolts (29a) of the fastening arrangement. The second gripping formation may thus provide a passage (34) for fingers of a user therethrough for ease of gripping. The curved frame may include a slit (36) for attaching a leash to the accessory (10). Together, both the first and second gripping formation (30, 32) provide for two handed gripping of the accessory (10).

The second assembly piece (12b) may be provided by a rectangular frame (37) with dimensions which correspond to those of the side wall (24) of the first assembly piece (12a) such that the second assembly piece (12b) can be connected to the first assembly piece (12a) with the rectangular frame suprajacent the sidewall of the first assembly piece when in a closed configuration. The frame (37) of the second assembly piece (12b) may define a window for receiving a membrane (38) for providing optical communication between the cavity (14) and an exterior of the enclosure (12).

In the illustrated embodiment, the frame (37) is formed from a sold piece of material with an approximately rectangular cross section and arranged in a generally rectangular shape so as to define the window for receiving the membrane. The frame may include holes for receiving protuberances of the membrane so as to hold the membrane in place. A surface of the frame which operatively engages a sealing rim of the membrane may include castellations which cooperate with castellations provided on the sealing rim.

In other embodiments (e.g. as illustrated in FIGS. 23 to 27), the frame (37) of the second assembly piece (12b) may include two opposing, endless walls which define the window and which are shaped and dimensioned to provide a rectangular shape that fits above the sidewall of the first assembly piece. The endless walls may be joined together at ends thereof by a bridging wall such that a channel or groove formation is defined and against which the rim of the membrane engages. The bridging wall may have castellations which cooperate with castellations provided on the sealing rim of the membrane. Ribbing formations may be formed within the groove formation to repeatedly connect the endless walls to each other. The groove and ribbing formations provide a frame with adequate structural integrity while minimizing material cost. The groove formation may have a depth and width which may correspond to the height and width of the ribbing formations.

In the illustrated embodiment, a peripheral wall (49) surrounds the frame (37). The peripheral wall (49) is shaped so as to conform to a profile of the first assembly piece in that it includes a rectangular portion connected to a circular portion to define a thermometer-type shape. The peripheral wall (49) is connected to the frame (37) and operates to support and provide structural integrity to eye formations (45) disposed on the second assembly piece.

The membrane (38) may be flexible and may be fitted to the frame (37) of the second assembly piece (12b) to close the window thereof. In some implementations, the membrane is resiliently flexible such that it returns to a resting state or condition after application of a force which deforms its shape or condition. For example, the membrane may be formed of a suitable material such as vinyl, silicone or rubber. In some implementations, the membrane may be a peroxide cured silicone membrane. Peroxide curing may improve mechanical properties of the membrane (such as improved strength) and may lower the cost of manufacture. The membrane may include additives to improve resistance to heat and oil. The interface between the membrane (38) and the second assembly piece (12b) may be sealed so as to prevent ingress of water at selected pressures. In the illustrated embodiment, the membrane includes a rectangular sealing rim (38a) surrounding a planar sheet (38b). The sealing rim includes protuberances (38c) which locate in corresponding eyes of the bridging wall of the second assembly piece and operate to fasten the membrane (38) to the second assembly piece (12b). The protuberances may be in the form of sprues from molding of the membrane and may be used to securely hold the membrane in position in the second assembly piece. The membrane (38) may be secured within the window by molding the second assembly piece (12b) together with the membrane (38) fitted within the mound (e.g. by over-molding). In a closed condition of the enclosure, the sealing rim (38a) is urged between the bridging wall of the second assembly (12b) piece and a rim defined by the side wall (24) of the first assembly piece (12a) and seals closed the interface between the first and second assembly pieces. This may provide a suitable seal against the ingress of water in operation and may obviate the need for a separate seal member. The membrane thus provides an integrated screen and sealing mechanism. In the illustrated embodiment, the sealing rim is castellated. The window and membrane (38) may cooperate to enable interaction by a user with a user interface (e.g. a touch-sensitive interface in the illustrated embodiment) of a portable electronic device (16) located in the cavity (14).

The accessory (10) may include a fastening mechanism for fastening the first and second assembly pieces (12a, 12b) together. In this embodiment, the fastening mechanism includes a hinge arrangement (40). In some embodiments, the hinge arrangement (40) may be centrally disposed between the first and second assembly pieces (12a, 12b). In other words, a center point of the hinge arrangement about which rotation occurs may be located in a plane defined by the interface between the first and second assembly pieces. The hinge mechanism may be located at the second minor side of the enclosure (12) and operates hingedly to connect the first assembly piece (12a) to the second assembly piece (12b).

In the illustrated embodiment, the fastening mechanism further includes nut and bolt arrangements located along the periphery of the enclosure. In the illustrated embodiment, the fastening mechanism includes six nut and bolt arrangements, with two nut and bolt arrangements located on each major side of the enclosure a further two nut and bolt arrangements locating on a free, minor end of the enclosure (opposite the hinge arrangement). The nut and bolt arrangements may be generally equally spaced around the two major sides and the free, minor end of the enclosure. In other embodiments, other arrangements of nuts and bolts may be provided. It is also anticipated that the fastening mechanism may include other forms of fasteners for securing the first assembly piece to the second assembly piece. For example, other implementations may make use of any suitable arrangement of clips, clasps or the like which facilitate easy opening and closing of the enclosure.

In the illustrated embodiment, each of these nut and bolt arrangements includes a nut formation (41) which is fixed to the enclosure (12). The nut formations may be provided by hollow cylinders which receive a shaft of a bolt. The nut formations (41) may be fixed to one or both of the circular member (22) and the first assembly piece (12a). The nut formations (41) may be integrally formed with the circular member (22) and the first assembly piece (12a) (e.g. integrally molded therewith). The nut formations may be threaded for cooperation with the bolts (43).

Each nut and bolt arrangement may further include an eye formation (45) disposed on the second assembly piece (12b) at locations which correspond to those of the nut formations (41). Each of the eye formations (45) provides a through-hole for receiving the shaft of a cooperating bolt (43). In the illustrated embodiment, the eye formations (45) are supported the peripheral wall (49) which forms a part of the second assembly piece (12b). As mentioned, in the illustrated embodiment, the peripheral wall (49) is shaped to conform to the periphery of the circular member (22). The eye formations (45) and peripheral wall (49) may be integrally formed with the second assembly piece (12b) (e.g. integrally molded therewith).

Bolts (43) of the nut and bolt arrangement include a threaded shaft shaped and dimensioned to cooperate with the threading of the nut formations (41). The bolts may be provided by thumb screws having an enlarged head to provide a gripping formation for easy opening and closing of the enclosure by hand.

The nut and eye formations are arranged such that with the first assembly piece (12a) engaging the second assembly piece (12b), the respective nut and eye formations align such that the cooperating bolt may pass through the eye formation and into the nut formation for securing therein.

The cavity (14) may therefore be accessed via the hingedly connected first and second assembly pieces (12a, 12b). When closed, the seal provided by the membrane may provide a watertight cavity at selected pressures.

One or more of first and second assembly pieces and the circular member may be made or formed from any suitable plastics material. For example, the first and second assembly pieces and the circular member may be molded from a suitable glass-filled polymer or glass-filled plastic (e.g. glass filled nylon) material to provide a reinforced enclosure for housing the portable electronic device. One or more of first and second assembly pieces and the circular member may be made or formed from an opaque material that does not permit the transmission of visible light therethrough.

An insert member (44) may be provided for operatively holding a cooperating portable electronic device in a position in the cavity (14) in which one or more of the camera lenses of the portable electronic device locate within the camera receiving zone of the cavity (14).

The insert member (44) may be sold together with or separately from the accessory (10). In some implementations, for example, device specific insert members may be sold separately for use together with the accessory. The packaging or other literature associated with the accessory may for example instruct the purchase of the appropriate device specific insert member.

In the illustrated embodiment, the insert member (44) is provided by a foam insert. In the illustrated embodiment, the cavity is generally rectangular in shape and the insert member is thus in the form of a rectangular solid. The insert member may also be in the form of a foam-filled rectangular solid. The rectangular solid may have rounded or radiused corners which conform to the shape of corners of the cavity. The rectangular solid may therefore be generally rectangular in shape.

The insert member (44) may be shaped and dimensioned to fit within and substantially fill a volume defined by the cavity (14). The insert member (44) may have a shape and dimensions which conform to that of the cavity (14) defined by the enclosure. In other words, the shape and dimensions of the insert member (44) may be the same as the shape and dimensions of the cavity such that the insert member fills the cavity. The fit may be selected to be tight such that the insert member cannot move or shift position while located in the cavity. Dimensions of the insert member may be selected so as to provide a snug fit of the insert member within the cavity. For example, the insert member dimensions may be the same as, or even slightly greater than, the dimensions of the cavity and the compressibility of the foam insert may be selected to cooperate with the dimensions such that edges of the insert member bear against internal surfaces of the cavity to hold the insert member securely in place.

In the illustrated embodiment, the insert member (44) includes a cut-out portion (46) for operatively receiving and holding a cooperating portable electronic device (16). Different implementations may provide for insert members of different thickness. In the illustrated embodiment, the insert member (44) has a thickness which corresponds to a thickness of the cavity (14). In use, with a portable electronic device locating within the cut-out, and as shown most clearly in FIGS. 11 and 12, an insert member having a thickness which corresponds to that of the cavity provides a spacing or gap (51) between the touch-sensitive interface of the portable electronic device (16) and the planar sheet (38b) of the membrane. As mentioned above, the thickness of the cavity (14) and insert member (44) are selected so as to exceed a maximum thickness of the selected range of portable electronic device dimensions. For example, the thickness may be between 10 mm and 20 mm. In other embodiments, the thickness of the insert member may be selected such that two (or possibly three) insert members can be accommodated within the cavity. For example, a first insert member may have only one cut-out portion to allow optical communication of the camera lens of the portable electronic device with the dome lens, while a second insert member may have a cut-out portion for receiving and holding the portable electronic device. In some embodiments, both insert members may be cut out to receive the portable electronic device which ensures a thickness large enough to space the flexible membrane away from the touch-sensitive interface of the portable electronic device (as described in the foregoing).

The insert member may be sold without any cut-out formed therein. In some implementations, the insert member (44) may include one or more templates for cut-outs for holding the portable electronic device (16). For example, a single insert member may include templates and optionally labels for a variety of portable electronic device makes and models to assist the user in creating a cut-out which corresponds to the dimensions of his or her portable electronic device.

In the illustrated embodiment, the insert member (44) includes a second cut-out (47) (or optionally one or more templates for a second cut-out) which is shaped and dimensioned to receive a remote-control device. When received therein, the remote control may enable a user to change modes of a cooperating portable electronic device. For example, the remote control may cooperate with the portable electronic device and may include one or more buttons for changing between a picture mode and a video mode or for taking pictures or videos. The buttons may be large enough such that they can easily be pressed through the membrane (38) by a user. It should be appreciated that the oversized nature of the cavity, and hence the insert member, relative to the portable electronic device, may allow for flexibility and user customization as to enable utilization of the free-space.

In use, the accessory (10) may for example be provided with one or more insert members (44), which may have two or more templates for cut-outs (46) for operatively locating and holding a selected range of portable electronic device dimensions. A user may identify a template corresponding to the user's portable electronic device (16) and may cut out the template to place the portable electronic device (16) therein. The insert member (44) including the portable electronic device (16) are placed in the cavity (14) and are arranged such that a camera lens of the portable electronic device (16) locates in a camera lens receiving zone in the cavity (14). The camera lens receiving zone includes the aperture (20) for operatively providing optical communication between the camera lens of the portable electronic device (16) and the dome lens (28a) of the lens arrangement (26). The flexible membrane (38) may be pinched away from the touch-sensitive interface of the portable electronic device (16) and the first and second assembly pieces (12a, 12b) are then secured together to provide (with the membrane still pinched away) a waterproof enclosure for the portable electronic device (16) in the cavity (14). The portable electronic device (16) may then be used in underwater photography. Pinching the flexible membrane (38) away from the touch-sensitive interface of the portable electronic device (16) while securing the first and second assembly pieces (12a, 12b) together causes more air to be trapped within the cavity (14) and in turn causes the flexible membrane (38) to be pushed out by the air pressure difference and away from the touch-sensitive interface of the portable electronic device (16). This reduces interference with the functioning of the touch-sensitive interface, which can otherwise occur, if the membrane (38) is allowed to touch it.

Figure 13:
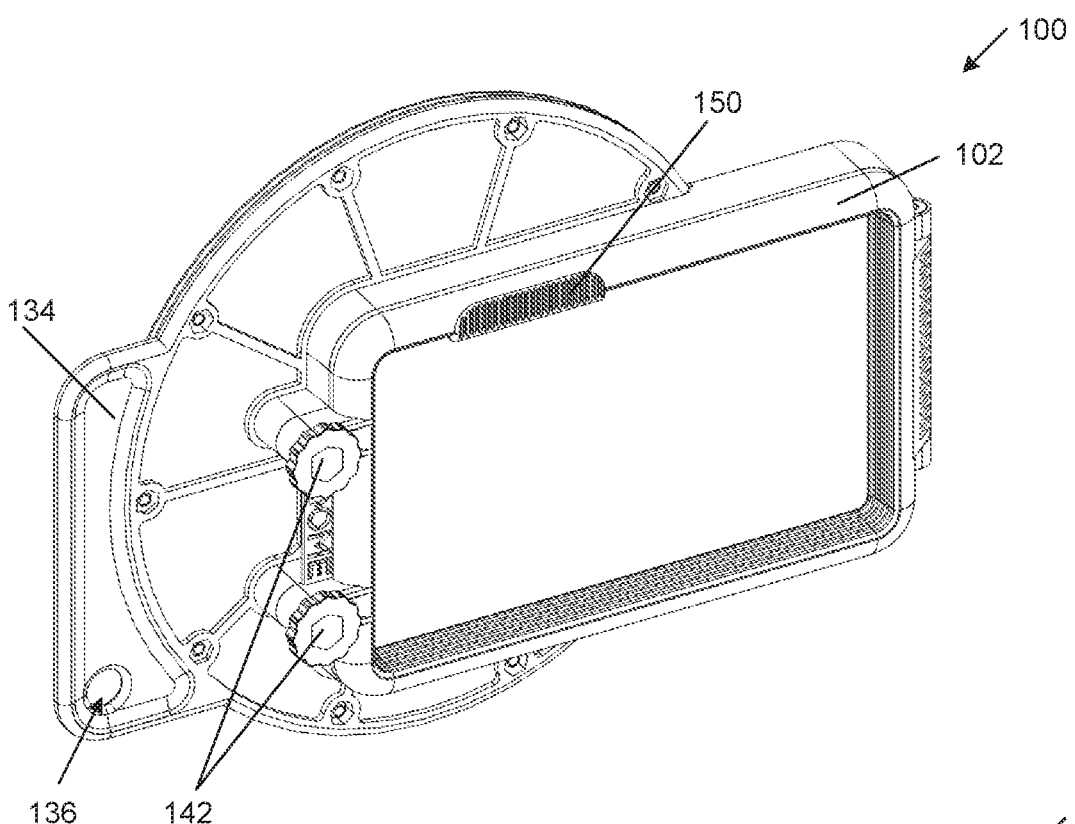
FIG. 13 is a rear three-dimensional view of an accessory according to another embodiment of the present disclosure.
Figure 14:
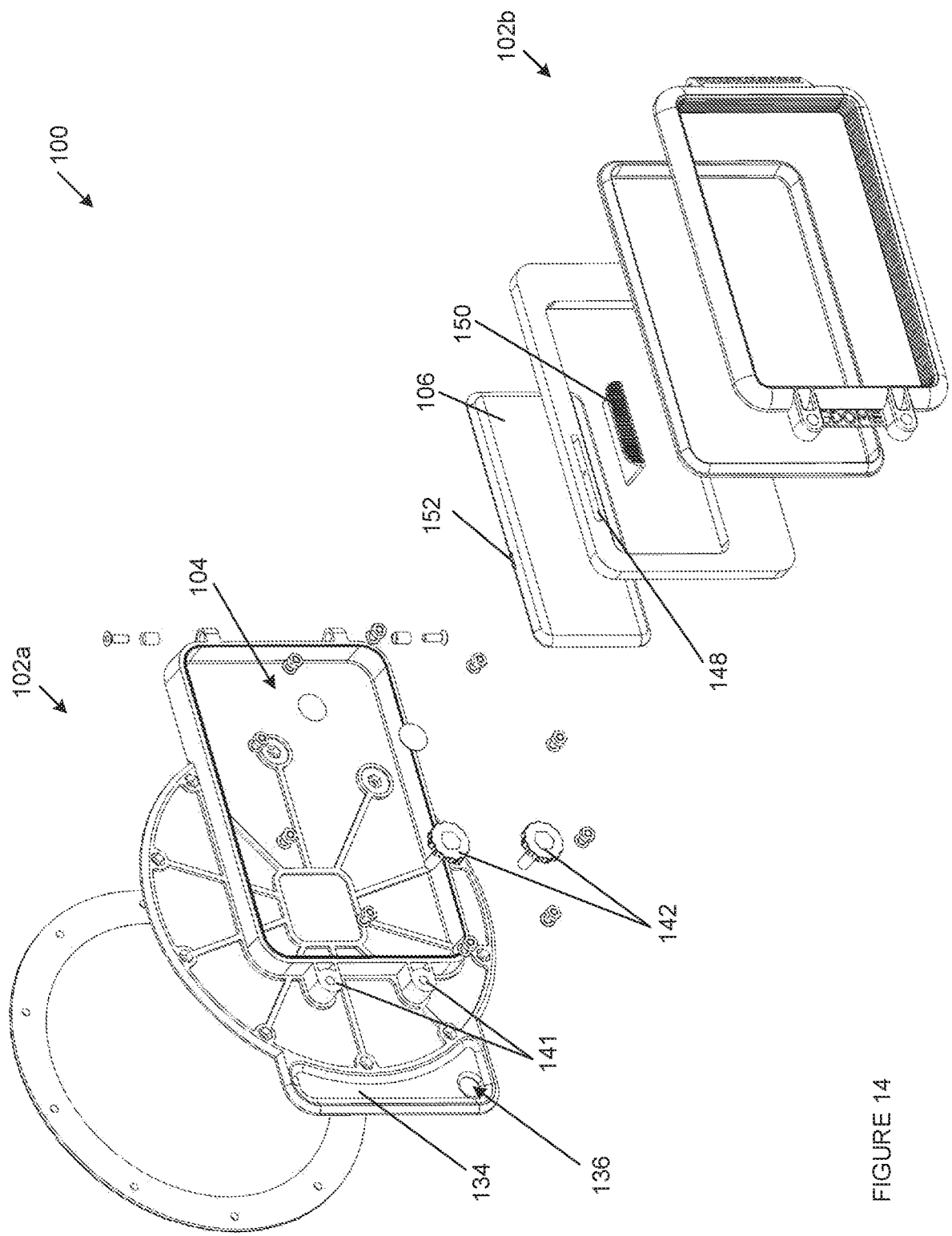
FIG. 14 is an exploded view of the accessory of FIG. 13.

An alternative embodiment of an accessory (100) is illustrated in FIGS. 13 and 14. The accessory (100) is substantially similar to the accessory (10) described above. For example, the accessory (100) includes an enclosure (102) defining a cavity (104) configured to enclose a portable electronic device therein. The enclosure (102) includes a first assembly piece (102a) and a second assembly piece (102b) removably securable to the first assembly piece (102a).

The accessory (100) of the embodiment illustrated in FIGS. 13 and 14 differs primarily in the arrangement of the fastening mechanism. In the present embodiment, the fastening mechanism includes a nut and bolt arrangement at a first minor side of the enclosure (102). The nut and bolt arrangement includes two nut formations (141) which are fixed to the enclosure (and in the illustrated embodiment, integrally formed therewith). The nut formations (141) are spaced apart from each other along the first minor end of the enclosure and are threaded for receiving the cooperating bolts. The nut and bolt arrangement further includes eye formations which are disposed on the second assembly piece (102b) at locations which correspond to those of the nut formations. Each of the eye formations provides a through-hole for receiving a cooperating bolt (142) of the nut and bolt arrangement. The nut and eye formations are arranged such that with the first assembly piece engaging the second assembly piece, the respective nut and eye formations align such that the cooperating bolt may pass through the eye formation and into the nut formation for securing therein.

Further, in the embodiment illustrated in FIGS. 13 and 14, the second gripping formation (30) may include a concavity (134) therein for ease of gripping and an eye (136) for attaching a leash to the accessory (100). Further, the insert member includes a slot (148) configured to receive an operable member (150) therein. The operable member (150) is configured to operate a push button (152) disposed on a side of the cooperating portable electronic device (106). In this embodiment, the operable member (150) is L-shaped to define a knurled face and a base which extends into the slot (148). The slot (148) may be angularly disposed for ease of operation of the push button (152) by the operable member (150). For example, the slot (148) may be angularly disposed such that an axial movement of the operable member (150) into the slot (148) translates into a transverse movement of the base of the operable member (150) to push the button (152) disposed on the side of the portable electronic device (106).

Figure 15:
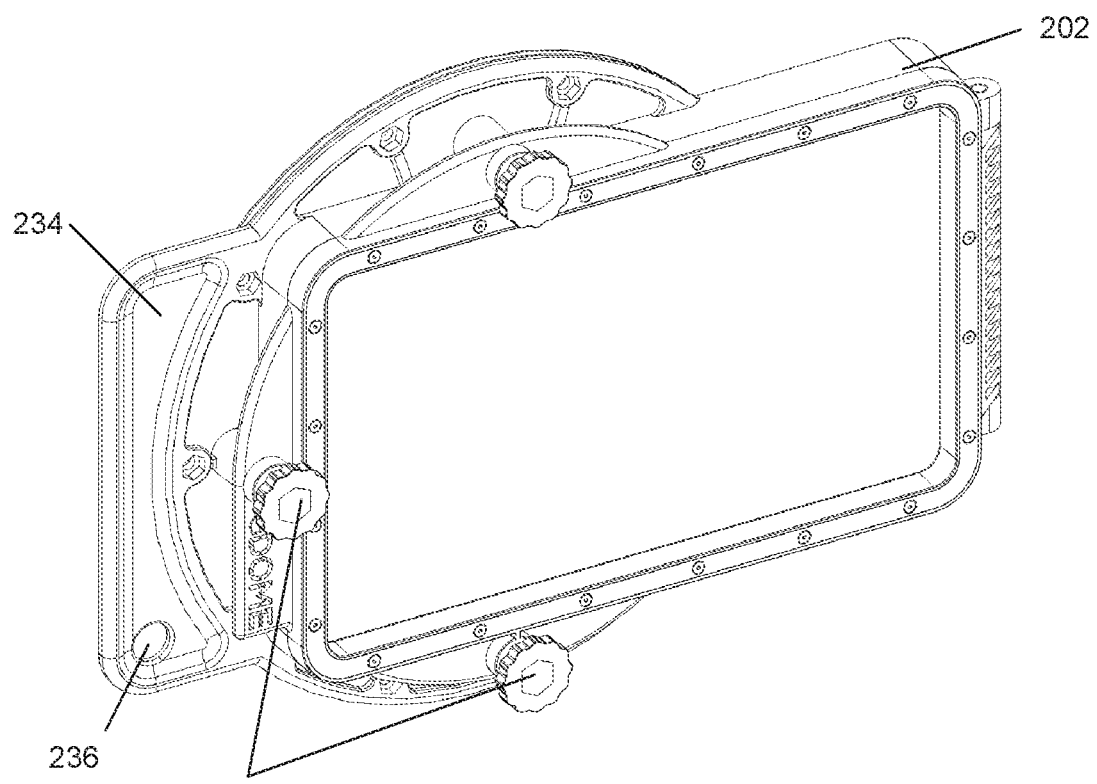
FIG. 15 is a rear three-dimensional view of an accessory according to another embodiment of the present disclosure.
Figure 16:
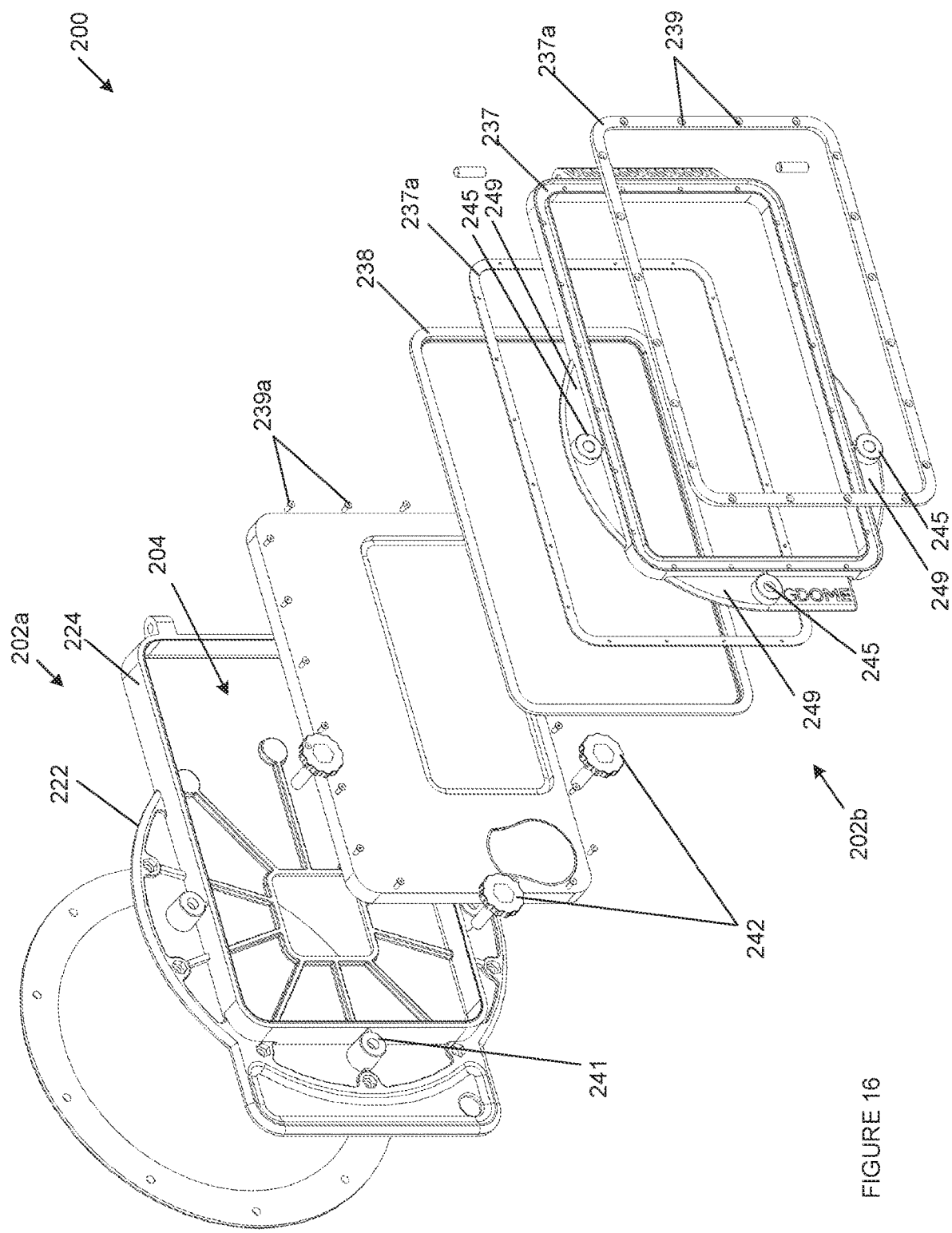
FIG. 16 is an exploded view of the accessory of FIG. 15.

An alternative embodiment of an accessory (200) is illustrated in FIGS. 15 and 16. The accessory (200) is substantially similar to the accessory (10) described above. For example, the accessory (200) includes an enclosure (202) defining a cavity (204) configured to enclose a portable electronic device therein. The enclosure (202) includes a first assembly piece (202a) and a second assembly piece (202b) removably securable to the first assembly piece (202a).

In the embodiment illustrated in FIGS. 15 and 16, a nut and bolt arrangement is provided at a first minor side of the enclosure (202) together with nut and bolt arrangements provided opposite each other on each of a first and second major side of the enclosure (202). The two opposing nut and bolt arrangements may be located towards the first minor side of the enclosure (202). Each nut and bolt arrangement includes a nut formation (241) which is fixed to the enclosure (202) and an eye formation (245) disposed on the second assembly piece (202b) at locations which correspond to those of the nut formations (241) and bolts (242). The eye formations (245) are supported by flanges (249) which extend from and generally in the plane of the second assembly piece (202b). The flanges (249) are shaped to conform to the periphery of the circular member (222), except for the flange extending from the first minor side which breaks from the shape of the periphery of the circular member (222) such that an outer edge thereof extends parallel to and along the first minor side.

The second assembly piece (202b) may be provided by a rectangular frame (237) with dimensions which correspond to those of a side wall (224) of the first assembly piece (202a) such that the second assembly piece (202b) can be connected to the first assembly piece (202a). The frame (237) of the second assembly piece (202b) may include complementary secondary frames (237a) disposed on either side of a main frame (237) and together define the window for receiving the membrane (238). The secondary frames (237a) may be formed of metal which may provide added rigidity to the second assembly piece (202b). The frames (237, 237a) may further include a plurality of through-holes (239) each for receiving a fastener (239a) for assembling the second assembly piece (202b). The through-holes (239) and fasteners (239a) may have cooperating threaded formations which engage with one another to assemble the second assembly piece (202b). In some implementations, the secondary frame (237a) closest to the circular member (i.e. an inner secondary fame) may have a thread that will cause the outer secondary frame to bite when fitting the fasteners (239a) having cooperating thread. In some implementations, one or both of the secondary frame members may fastened using a suitable adhesive or glue. In some implementations, one or both of the secondary frames (237a) may be secured to the main frame (237) by, for example, over-molding the frames together.

Figure 17:
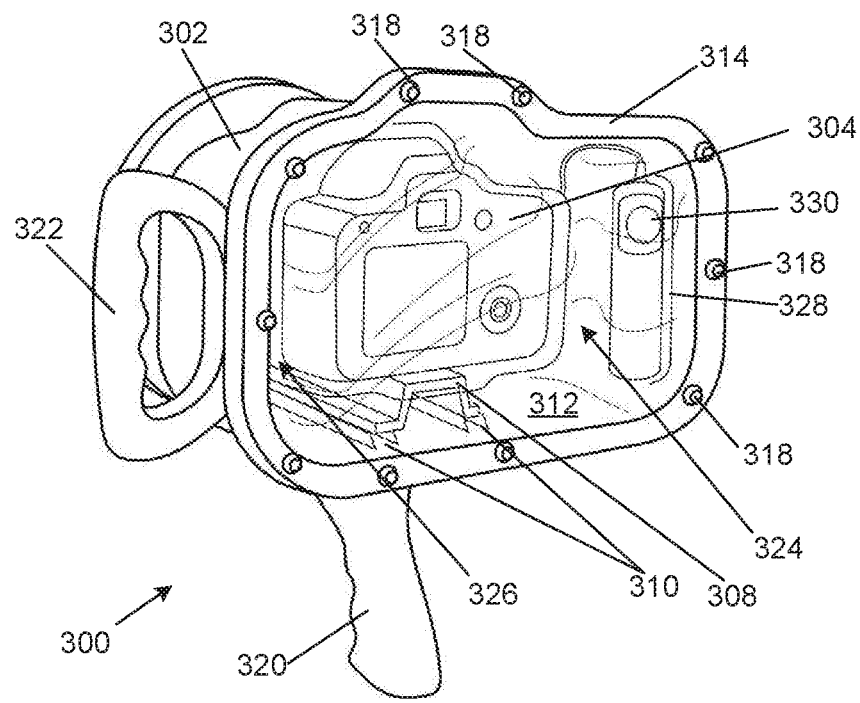
FIG. 17 is a three-dimensional view from a rear end of an accessory according to another embodiment of the present disclosure.
Figure 18:
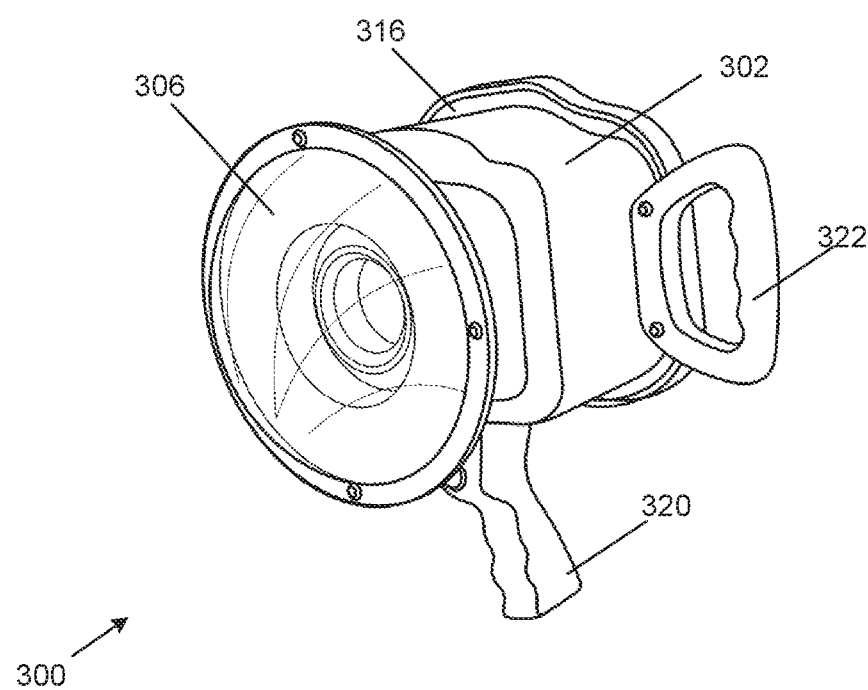
FIG. 18 is a three-dimensional view of the accessory of FIG. 17 from a front end thereof.
Figure 19:
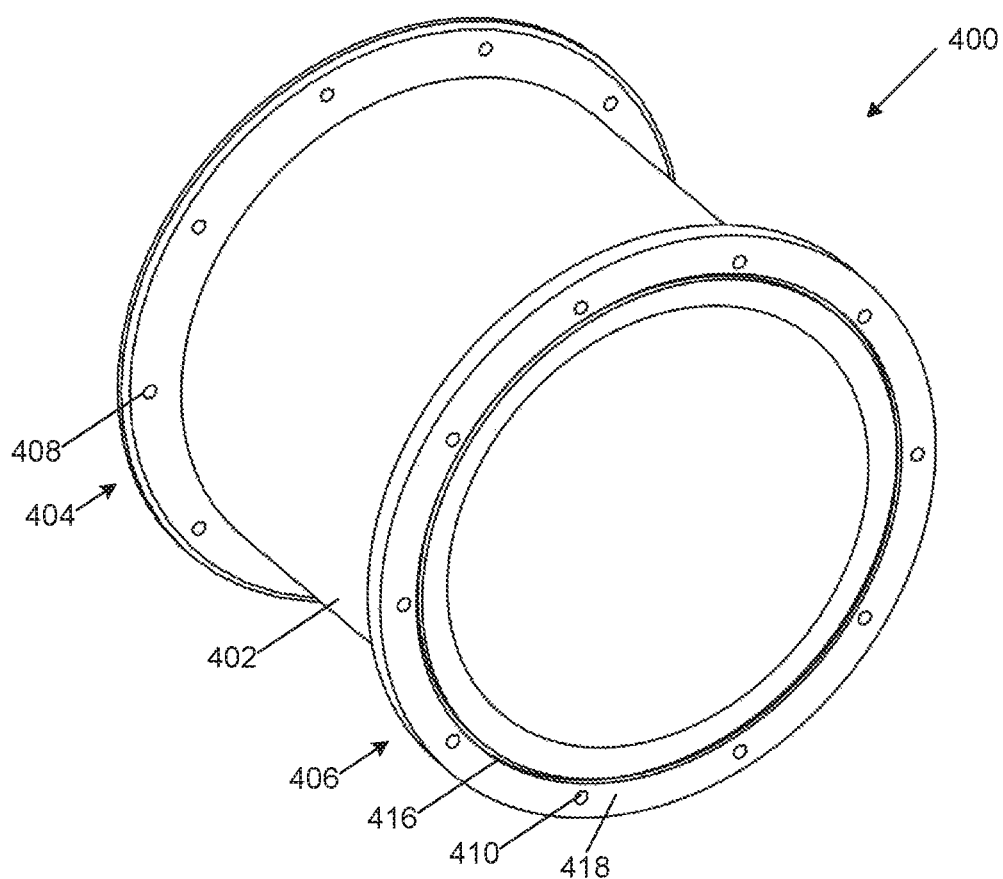
FIG. 19 is a three-dimensional view from a front end of an extension member according aspects of the present disclosure.
Figure 20:
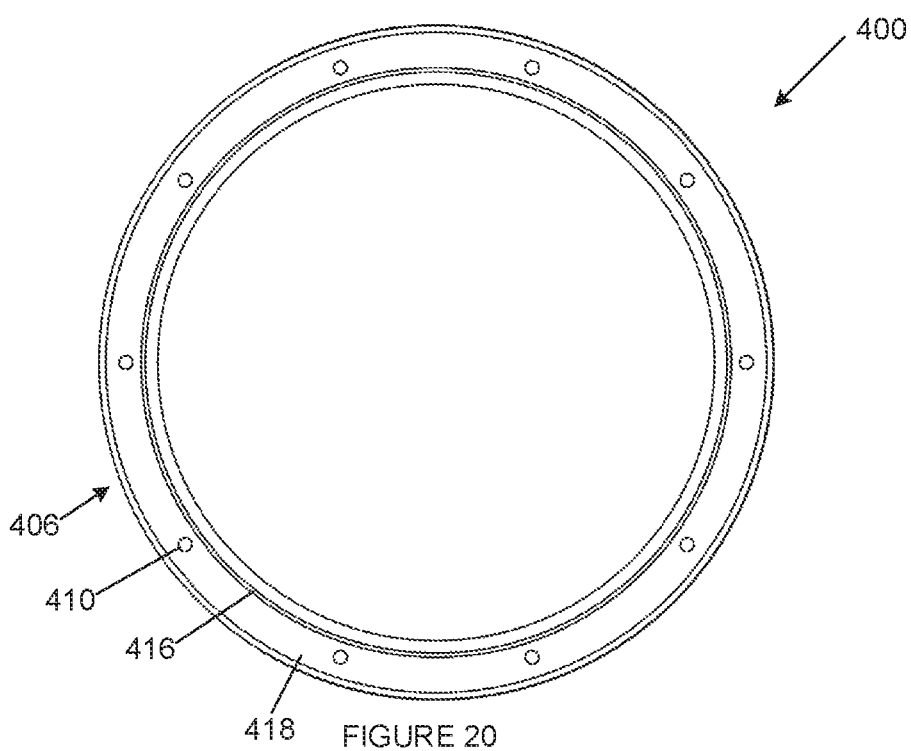
FIG. 20 is a front-view of the extension member of FIG. 19.
Figure 21:
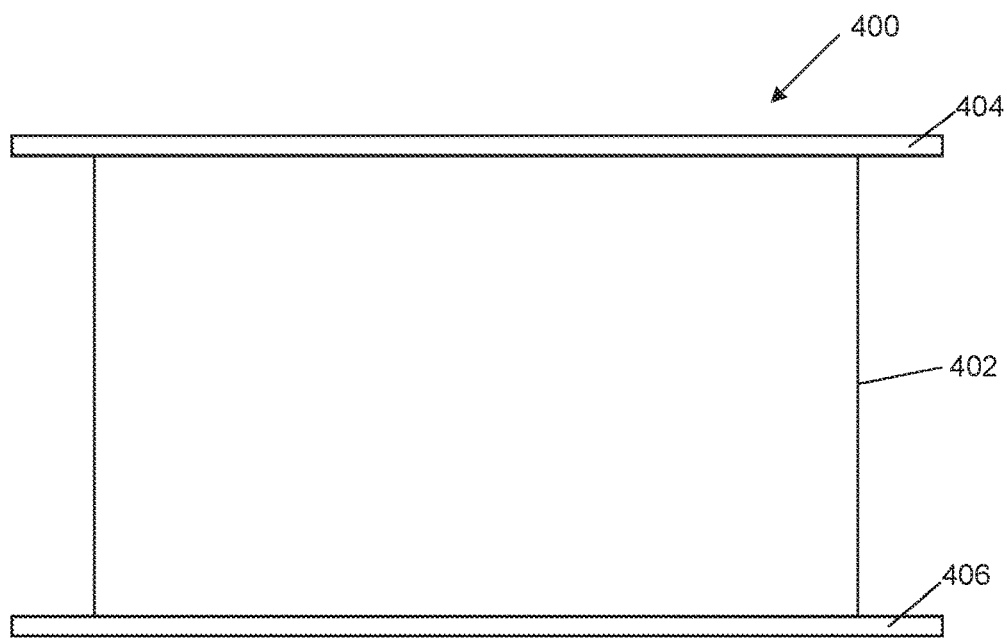
FIG. 21 is a side-view of the extension member of FIG. 19.
Figure 22:
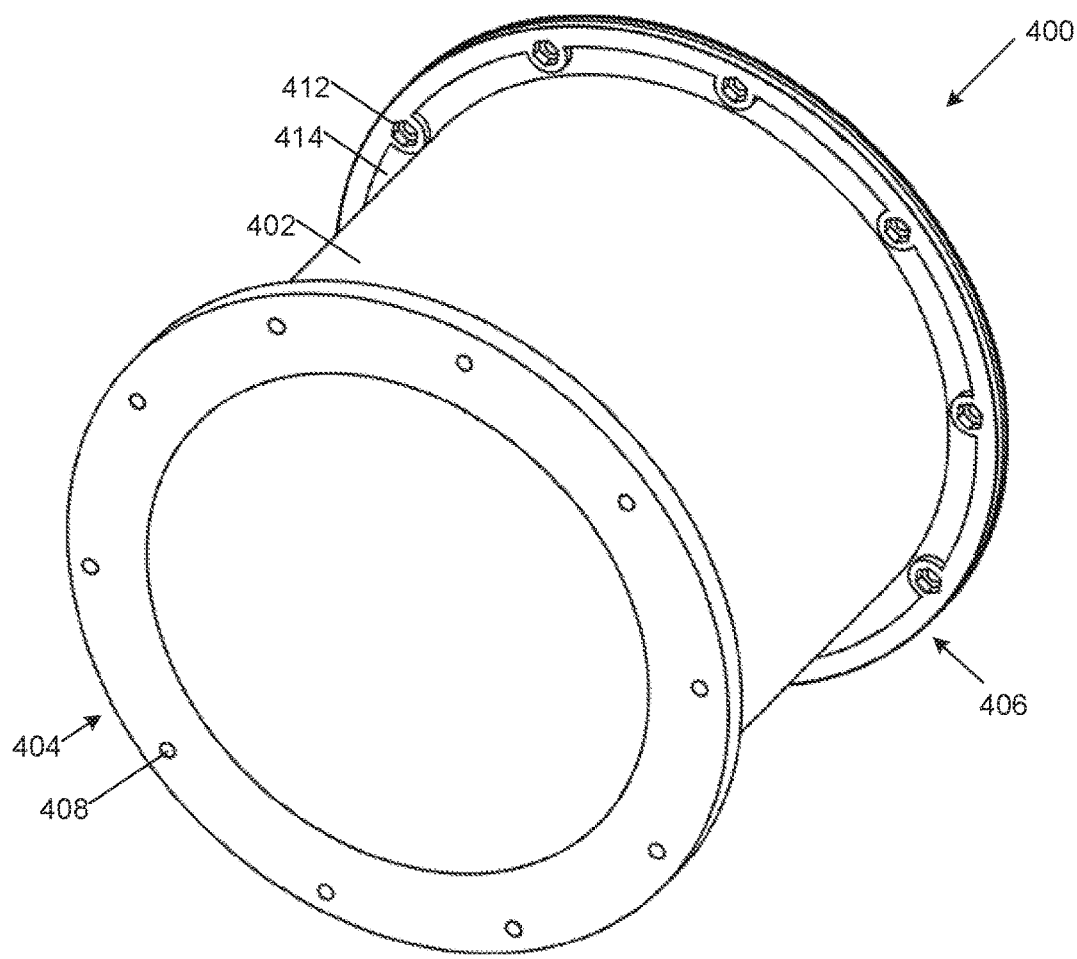
FIG. 22 is a three-dimensional view from a rear end of the extension member of FIG. 19.
Figure 23:
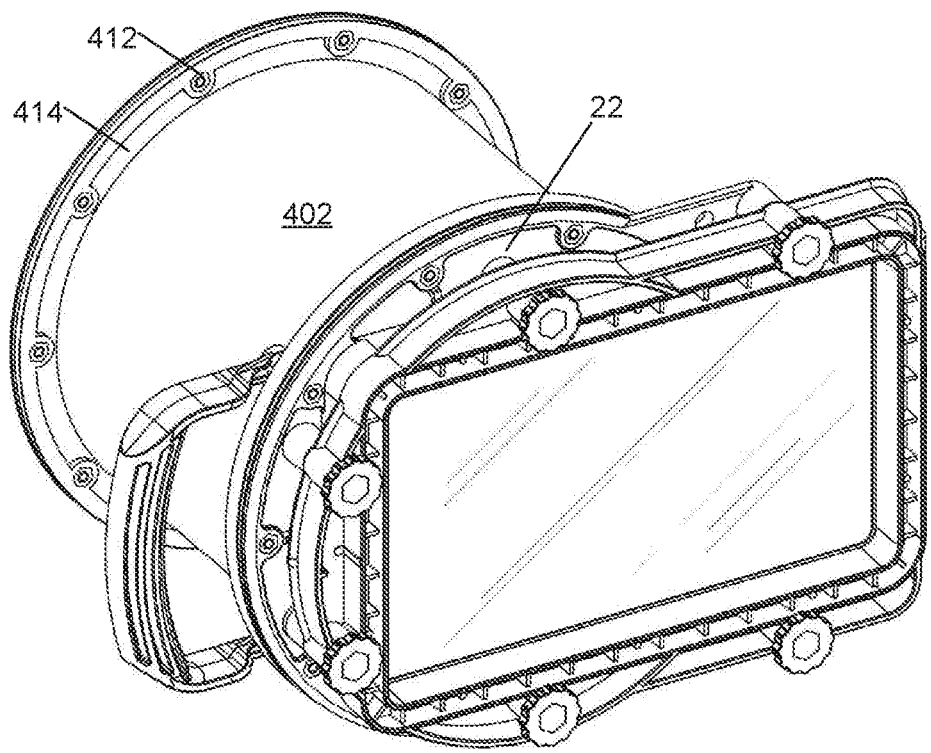
FIG. 23 is a three-dimensional view from a rear-end of an accessory according to aspects of the present disclosure including the extension member of FIG. 19 secured thereto.
Figure 24:
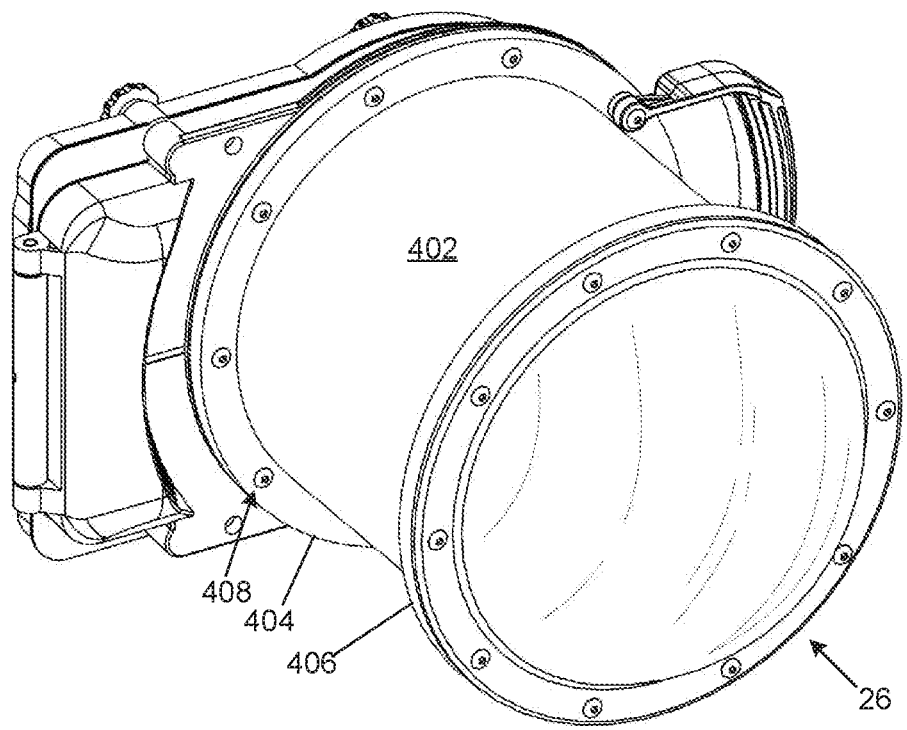
FIG. 24 is a three-dimensional view of the accessory of FIG. 23 from a front-end thereof.
Figure 25:
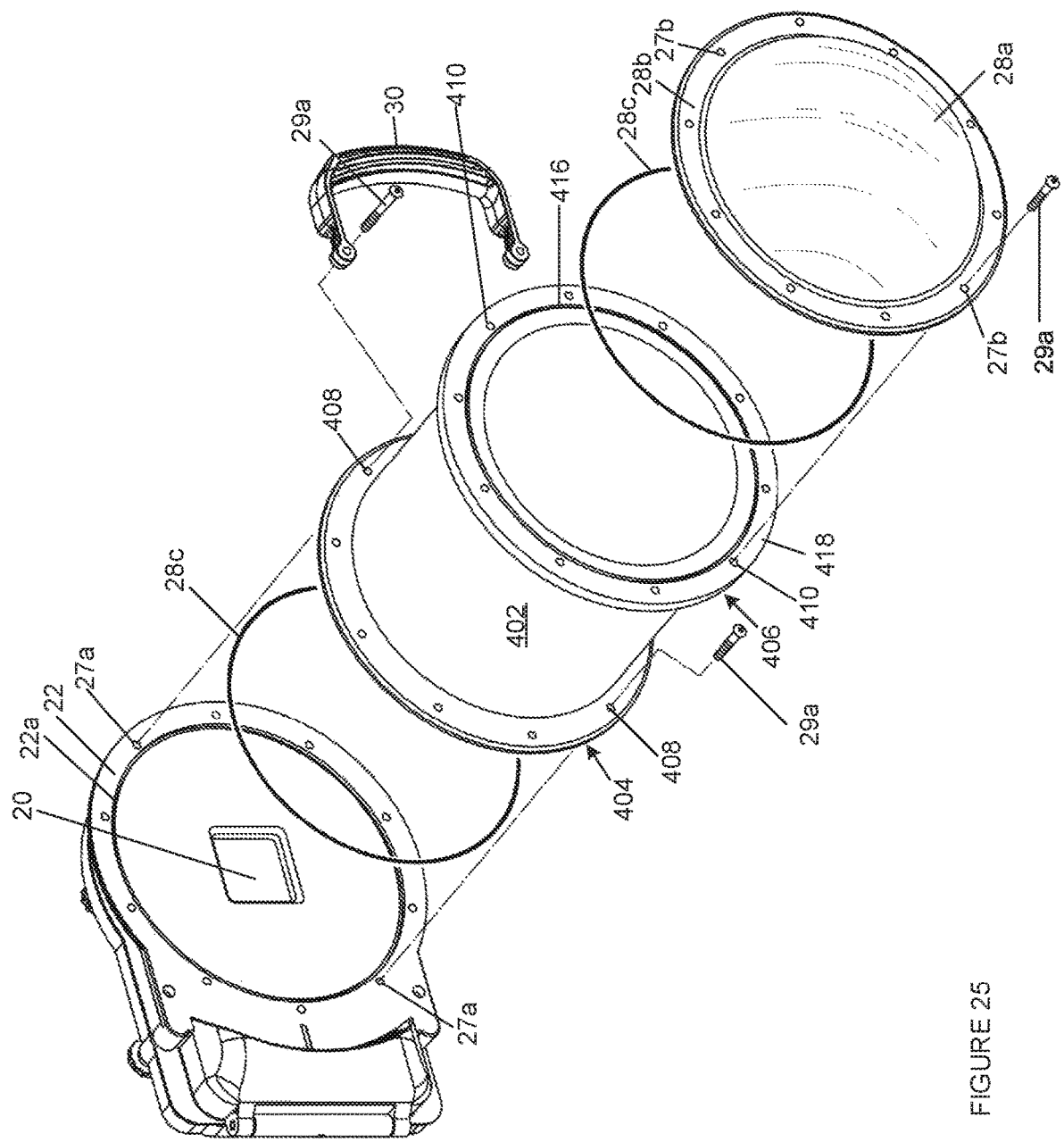
FIG. 25 is a three-dimensional exploded view of the accessory of FIG. 23 from a front end thereof.

An alternative embodiment of an accessory (300) is illustrated in FIGS. 17 to 18. In this embodiment, the enclosure (302) is shaped and dimensioned to receive a portable electronic device (304) in the form of digital camera. The enclosure is secured to a lens arrangement (306), shown in FIG. 18 as a dome lens arrangement. The enclosure defines a cavity configured to enclose the portable electronic device. The enclosure includes an aperture formed in a wall thereof and operatively providing optical communication between a camera lens receiving zone of the cavity and a lens of the lens arrangement (306). The cavity is dimensioned to accommodate a selected range of portable electronic device dimensions and the aperture may be dimensioned such that the camera lens receiving zone operatively accommodates various camera lens positions therein. The cavity accommodates an insert member for operatively holding a cooperating portable electronic device in a position in which a camera lens thereof locates within the camera receiving zone of the cavity. In this embodiment, the insert member may be provided by a support frame (308) which locates within rails (310) provided by the enclosure. The support frame includes a securing mechanism for securing to the portable electronic device. The supporting frame may be adjustable or different frames may be provided to accommodate various positions within the cavity of a portable electronic device secured thereto.

The enclosure defines a window and supports a membrane (312) within the window. The membrane may be a flexible membrane. The membrane may be similar to the membrane of the embodiment illustrated in FIGS. 1 to 12 in that may have the same properties and characteristics of the membrane described in the foregoing. The membrane may be flexible and may include a sealing rim surrounding a concave portion of the membrane. In the illustrated embodiment, the membrane has a concave shape with a portion of the membrane being shaped so as to conform to the shape of the rear portion of a portable electronic device (304). The membrane may be molded in this shape. The membrane may thus be shaped so as to define, in cross-section through the accessory along an operatively horizontal axis thereof, two depressions (324, 326) joined by an elongate portion. The depressions are formed by the membrane protruding into the cavity and past the rear-most extent of the portable electronic device (304). The elongate portion abuts against a rear-most surface of the portable electronic device (304) (in the case of a digital camera, which typically includes a display). The depressions permit gripping and handling of the portable electronic device (304), and in particular, in the case of a digital camera, handling of the trigger grip typically located on the right-hand side of the digital camera. The membrane may thus permit a user to interact with the user interface of the portable electronic device (304).

In the illustrated embodiment, the enclosure defines an island formation which forms a recess (328) in the cavity. The island formation may facilitate gripping and manipulation of the enclosure by a user (e.g. in a similar fashion to the first gripping formation and its island formation illustrated in FIG. 2). The island formation and recess may be located towards a side of the enclosure. In the illustrated embodiment, the island formation and recess are located at or towards the right side of the enclosure from the perspective of a user operating a portable electronic device located within the enclosure.

The island formation is shaped and dimensioned such that the recess (328) can operatively receive a remote-control device (330) configured for connection to and interaction with the portable electronic device (304). For example, the remote-control device may cooperate with the portable electronic device and may include one or more buttons for changing between a picture mode and a video mode or for taking pictures or videos.

The enclosure may be shaped and dimensioned such that in use a space is left between the right-most side of the portable electronic device (304) and the remote-control device (330). The enclosure may be arranged such that the space is large enough to accommodate a user's hand in between the portable electronic device and the remote-control device. The depression (324) of the membrane is arranged to protrude into the cavity between the portable electronic device and remote-control device (330). In operation, the space between the right-most side of the portable electronic device and the remote-control device may be accessible to the user as the membrane at this point protrudes into the cavity by virtue of the depression (324). This may for example allow a user to grip a handgrip of the portable electronic device through the membrane (312).

The membrane may be fixed to a second assembly piece (314) of the enclosure (in a manner similar to the embodiment of FIGS. 1 to 12) and in use may be urged against a rim defined by a first assembly piece (316) of the enclosure to seal closed the interface between the pieces and provide a cavity which is watertight at selected pressures. A fastening mechanism in the form of a plurality of nut and bolt arrangements (318) may be provided to close the second assembly piece against the first assembly piece. The accessory further includes gripping formations (320, 322) for gripping by a user when using the accessory.

FIGS. 19 to 22 illustrate an example embodiment of an extension member (400) according to aspects of the present disclosure. FIGS. 23 to 27 illustrate the extension member in use with the embodiment of the accessory described above with reference to FIGS. 1 to 12. The extension member may be sold together with or separately from the accessory.

The extension member (400) includes a cylindrical portion (402) which terminates on either end with a flange (404, 406). The cylindrical portion (402) is provided by a hollow cylinder. The cylindrical portion may be formed from an endless wall in the shape of a cylinder. The cylindrical portion may be cut from elongate cylinder. Each of the two flanges may be molded or manufactured as single, integrally formed units, respectively. The flanges may be secured or fastened to the cylindrical portion by way of a suitable bond or weld. In some implementations, the cylindrical portion and flanges may be made from the same type of material (e.g. polyvinyl chloride, "PVC", glass-filled nylon, etc.) and may be welded together using an appropriate welding technique for that material. Cutting the cylindrical portion from an elongate cylinder and then fastening or securing the flanges thereto may permit for cost effective manufacture of extension members having a range of different heights without requiring purpose-built molds for each unique configuration. The extension member may be made from PVC as this material may be easier to weld or bond.

The width or diameter of the cylindrical portion (402) may be selected so as to approximate a width or diameter of the dome lens (28a) of the accessory. The height of the cylindrical portion may be selected so as to optimize usage or utilization of the dome lens (28a) by a portable electronic device.

The height of the cylindrical portion (402) may be selected as a function of a field of view of a camera lens of the portable electronic device. The term field of view may refer to a solid angle through which a detector of a particular portable electronic device is sensitive to electromagnetic radiation. A larger (or wider) field of view, denoted by a larger angle, may mean that a greater extent of a scene being photographed is visible to the portable electronic device at a particular point in time. As such, different makes and models of portable electronic devices may have different fields of view. Thus, different makes and models of portable electronic device may require extension members having cylindrical portions with differing heights. Portable electronic devices with larger fields of view may require an extension member having a shorter cylindrical portion relative to portable electronic devices having smaller fields of view.

The height of the cylindrical portion may be selected such that the width of an image plane projected onto the dome lens and defined by two lines extending radially away from a point in the camera lens receiving zone of the enclosure and separated by an angle equal to that of the field of view of a camera of the portable electronic device has an extent which approximates (and is preferably less than) the diameter of the dome lens. The height of the cylindrical portion for a given portable electronic device may be selected so as to maximize usage of the dome lens by a detector of the portable electronic device. The height (h) of the cylindrical portion may be selected as follows:

$$h \approx \frac{r}{\tan\frac{\theta}{2}}$$

where r is the radius of the dome lens (28a) and θ is the field of view of the camera of the particular portable electronic device with which the extension member is compatible.

In the illustrated embodiment, the flanges (404, 406) are annular in shape and extend radially away from top and bottom ends of the cylindrical portion so as to lie in planes which are perpendicular to an axis of the cylindrical portion.

A first of the two flanges may be termed an enclosure-facing flange (404) in that, when in use, it abuts and is secured to a circular member (22) of an enclosure of an accessory (10) as described herein. A second of the two flanges may be termed a dome-facing flange (406) in that, when in use, it abuts and is secured to a dome lens arrangement (26) of an accessory as described herein. The flanges (404, 406) may be equally sized (i.e. having the same thickness and radial extent). The flanges (404, 406) may have through-holes (408, 410) for securing the extension member to the enclosure and dome lens arrangement of an accessory, respectively. The through-holes (408, 410) may be provided at locations which correspond to bores (27a, 27b) which form a part of a fastening arrangement of the accessory for fasting the dome lens or an extension member to the backplate. The through-holes (410) of the dome-facing flange (406) may terminate in a nut-shaped (e.g. hexagonal) socket (412) on a first side (414) thereof for receiving a corresponding nut. Nuts (not shown) may be held captive in the bores by way of an extension which extends from the nut, passes through the bore and terminates in a flange. The dome-facing flange (406) may have a seat (416) formed in a second side (418) thereof for receiving a seal (28c). The seat may be in the form of a groove or channel and may have the same shape and dimensions as the seat (22a) defined in the circular member of the enclosure.

In use, the appropriately dimensioned extension member is interposed between the circular member (22) and dome lens arrangement (26) of the accessory (10). The extension member is arranged such that its central axis passes through a center of the circular member, and hence through the aperture and the center of the dome lens arrangement. Seals (28c) are fitted into the seats (22a, 416) of the circular member and dome-facing flange (406). The bores (27a, 27b) of the accessory and through-holes (408, 410) of the extension member are aligned and bolts (29a) are used to fasten the dome lens arrangement (26) to the dome-facing flange (406) and the circular member (22) to the enclosure-facing flange (404).

With the appropriate extension member fitted for the cooperating portable electronic device, utilization of the dome lens by a detector of the camera of the portable electronic device may be increased up to a maximum.

Aspects of the present disclosure extend to a method for manufacturing an extension member for an underwater photography accessory, such as the extension member described above with reference to FIGS. 19 to 27. FIG. 28 is a flow diagram which illustrates an example method (500) for manufacturing an extension member for an underwater photography accessory. The method includes receiving (502) a value representing the required height of the extension member. The method includes controlling (504) cutting a cylindrical portion having a height corresponding to the received value from an elongate cylinder. The method includes securing (506) an enclosure-facing flange (404) and a dome-facing flange (406) to either end of the cylindrical portion to produce an extension member having the required height. Securing may be by way of welding, bonding or the like.

In some implementations, the length of the extension member may be adjustable to accommodate different portable electronic devices.

The accessory of the present disclosure may be able to accommodate portable electronic devices of different sizes. The substantially larger diameter of the dome lens compared to the aperture on the back wall of the enclosure may permit a wide field of view of a camera lens of a cooperating portable electronic device in the cavity. Further, complex installation may be obviated by way of the insert member which may be selected or configured to cooperate with the particular dimensions of a user's portable electronic device. A user may for example simply identify a template or select an appropriate insert member corresponding to the user's portable electronic device.

The rigid enclosure of the accessory according to embodiments of the present disclosure may permit exposure of a portable electronic device located therein to higher hydraulic pressures (e.g. to enable use in deeper waters). In some implementations, this may be selected to align with standard Ingress Protection rating (IP rating) requirements for portable electronic devices. For example the enclosure may be manufactured and specified to comply with the IP68 requirements, which include protection against submersion beyond 1 m and for up to 30 minutes.

The accessory described above can be made to be compact, adjustable and simple to manufacture using available manufacturing facilities and without any complex or costly processes being involved. The accessory will most likely be made of a suitable plastics material, especially a fiber reinforced dough molding compound or other suitable plastics material. As mentioned above, the accessory may be injection molded with various components thereof fitted into the mound at the time of molding. This may lead to an enclosure which is more waterproof. Of course, in other embodiments, the accessory may be made of a suitable metal such as aluminum and designed to have thin walls. In such a case, the metal may still provide a rigid enclosure despite the accessory having thin walls.

It is appreciated that numerous variations may be made to the embodiments of the invention described above without departing from the scope hereof. For example, in other embodiments the accessory may be provided with a smaller lens arrangement to provide a more compact accessory. Some embodiments may provide an enclosure with different configurations of the first and second assembly pieces. For example, in some embodiments, a second assembly piece may take the form of an end piece which is fastened to and encloses a first assembly piece.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Throughout the specification and claims, unless the contents requires otherwise, the word 'comprise' or variations such as 'comprises' or 'comprising' will be understood to imply the inclusion of a stated integer, or group of integers, but not the exclusion of any other integer or group of integers.

The invention claimed is:

1. An accessory comprising an enclosure and a solid insert member, the enclosure being secured to a lens arrangement and defining a cavity configured to enclose a portable electronic device having a camera lens, the enclosure including an aperture formed in a wall thereof and operatively providing optical communication between a camera lens receiving zone of the cavity and a lens of the lens arrangement, wherein the cavity is dimensioned to accommodate a selected range of portable electronic device dimensions, wherein the aperture is dimensioned such that the camera lens receiving zone operatively accommodates various camera lens positions therein, and wherein a shape and dimensions of the solid insert member conform to that of the cavity defined by the enclosure such that the cavity accommodates the solid insert member for operatively holding, in a cut-out operatively formed therein, a cooperating portable electronic device in a position in which a camera lens thereof locates within the camera receiving zone of the cavity, wherein the solid insert member includes templates each in the shape of one of a variety of portable electronic device makes and models for a user operatively creating a cut-out for locating and holding the cooperating portable electronic device in the cavity.

2. The accessory as claimed in claim 1, wherein the enclosure includes a window for providing communication to a user interface of a portable electronic device and a membrane which closes the window, and wherein the membrane is translucent or transparent.

3. The accessory as claimed in claim 2, wherein the membrane is flexible so as to deform upon the application of force from a user's finger.

4. The accessory as claimed in claim 2, wherein the membrane is resiliently flexible.

5. The accessory as claimed in claim 1, wherein the solid insert member is a rectangular solid.

6. The accessory as claimed in claim 1, wherein the solid insert member is a foam-filled rectangular solid.

7. The accessory as claimed in claim 1, wherein a thickness of the solid insert member exceeds a maximum thickness of the selected range of portable electronic device dimensions.

8. The accessory as claimed in claim 1, wherein the enclosure is made from a rigid material and includes a first assembly piece fixed to the lens arrangement, the first assembly piece including the aperture, and a second assembly piece securable to the first assembly piece, the second assembly piece including a window for providing communication to a user interface of a portable electronic device.

9. The accessory as claimed in claim 8, wherein the lens arrangement is a dome lens arrangement, wherein a circular member is integrally formed with the wall in which the aperture is disposed to provide a backplate of the dome lens arrangement, and wherein the first assembly piece includes a side wall which encircles and extends perpendicularly away from the wall for connection to the second assembly piece.

10. The accessory as claimed in claim 9, wherein the aperture locates in the centre of the dome lens arrangement.

11. The accessory as claimed in claim 9, wherein the lens arrangement includes a dome lens removably secured to the circular member and wherein a diameter of the dome lens is substantially larger than a diagonal of the aperture.

12. The accessory as claimed in claim 9 including an extension member interposed between the circular member and the dome lens arrangement, wherein the extension member includes a cylindrical portion having a height which spaces the dome lens arrangement away from the aperture.

13. The accessory as claimed in claim 12, wherein the height of the cylindrical portion is selected based on a field of view of a selected portable electronic device and a diameter of a dome lens of the dome lens arrangement.

14. The accessory as claimed in claim 1, wherein the cavity is substantially rectangular having a diagonal of between 200 mm and 300 mm to accommodate the selected range of electronic device dimensions.

15. The accessory as claimed in claim 1, wherein the aperture is rectangular and having a diagonal of between 30 mm and 60 mm.

16. The accessory as claimed in claim 5, wherein the rectangular solid has rounded or radiused corners which conform to the shape of corners of the cavity.

17. The accessory as claimed in claim 1, wherein the solid insert member is shaped and dimensioned to fit within and substantially fill a volume defined by the cavity.

18. The accessory as claimed in claim 1, wherein solid insert member is a solid foam insert.

* * * * *